United States Patent
Maamari et al.

(10) Patent No.: US 12,471,106 B2
(45) Date of Patent: Nov. 11, 2025

(54) DOWNLINK CONTROL INFORMATION SCHEDULING MULTIPLE DOWNLINK OR UPLINK COMMUNICATIONS

(71) Applicant: QUALCOMM Incorporated, San Diego, CA (US)

(72) Inventors: Diana Maamari, San Diego, CA (US); Ahmed Elshafie, San Diego, CA (US); Huilin Xu, Temecula, CA (US); Prashanth Haridas Hande, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 431 days.

(21) Appl. No.: 18/055,208

(22) Filed: Nov. 14, 2022

(65) Prior Publication Data

US 2024/0163884 A1   May 16, 2024

(51) Int. Cl.
*H04W 72/23* (2023.01)
*H04W 72/121* (2023.01)

(52) U.S. Cl.
CPC ......... *H04W 72/23* (2023.01); *H04W 72/121* (2013.01)

(58) Field of Classification Search
CPC .............................. H04W 72/23; H04W 72/121
See application file for complete search history.

(56) References Cited

U.S. PATENT DOCUMENTS

| 12,250,081 B2* | 3/2025 | Stare ................ H04W 72/1273 |
| 2020/0178277 A1* | 6/2020 | Lee ...................... H04W 52/247 |
| 2021/0144743 A1* | 5/2021 | Rastegardoost ...... H04W 72/23 |
| 2021/0345337 A1* | 11/2021 | Ma ........................ H04W 72/23 |
| 2022/0201664 A1* | 6/2022 | Basu Mallick ........ H04W 72/23 |
| 2022/0304027 A1* | 9/2022 | Yang .................... H04W 72/23 |
| 2023/0019024 A1* | 1/2023 | Stare .................... H04W 72/30 |
| 2023/0328751 A1* | 10/2023 | Zhang .................. H04L 5/0094 370/329 |
| 2023/0328758 A1* | 10/2023 | Tang ................. H04L 25/03866 370/329 |
| 2023/0397180 A1* | 12/2023 | Lee ................... H04W 72/0457 |
| 2023/0422271 A1* | 12/2023 | Tang .................... H04L 1/1896 |
| 2024/0373440 A1* | 11/2024 | Lee ........................ H04W 72/23 |
| 2025/0016781 A1* | 1/2025 | Lee ........................ H04W 76/27 |

FOREIGN PATENT DOCUMENTS

WO     2022133893 A1    6/2022

* cited by examiner

*Primary Examiner* — Sujoy K Kundu
*Assistant Examiner* — Vladislav Y Agureyev
(74) *Attorney, Agent, or Firm* — Harrity & Harrity, LLP

(57) ABSTRACT

Various aspects of the present disclosure generally relate to wireless communication. In some aspects, a user equipment (UE) may receive, from a network node, downlink control information (DCI) that schedules multiple communications for each of one or more UEs in a group of UEs, the one or more UEs including the UE. The UE may communicate with the network node based at least in part on the multiple communications scheduled for the UE in the DCI. Numerous other aspects are described.

28 Claims, 14 Drawing Sheets

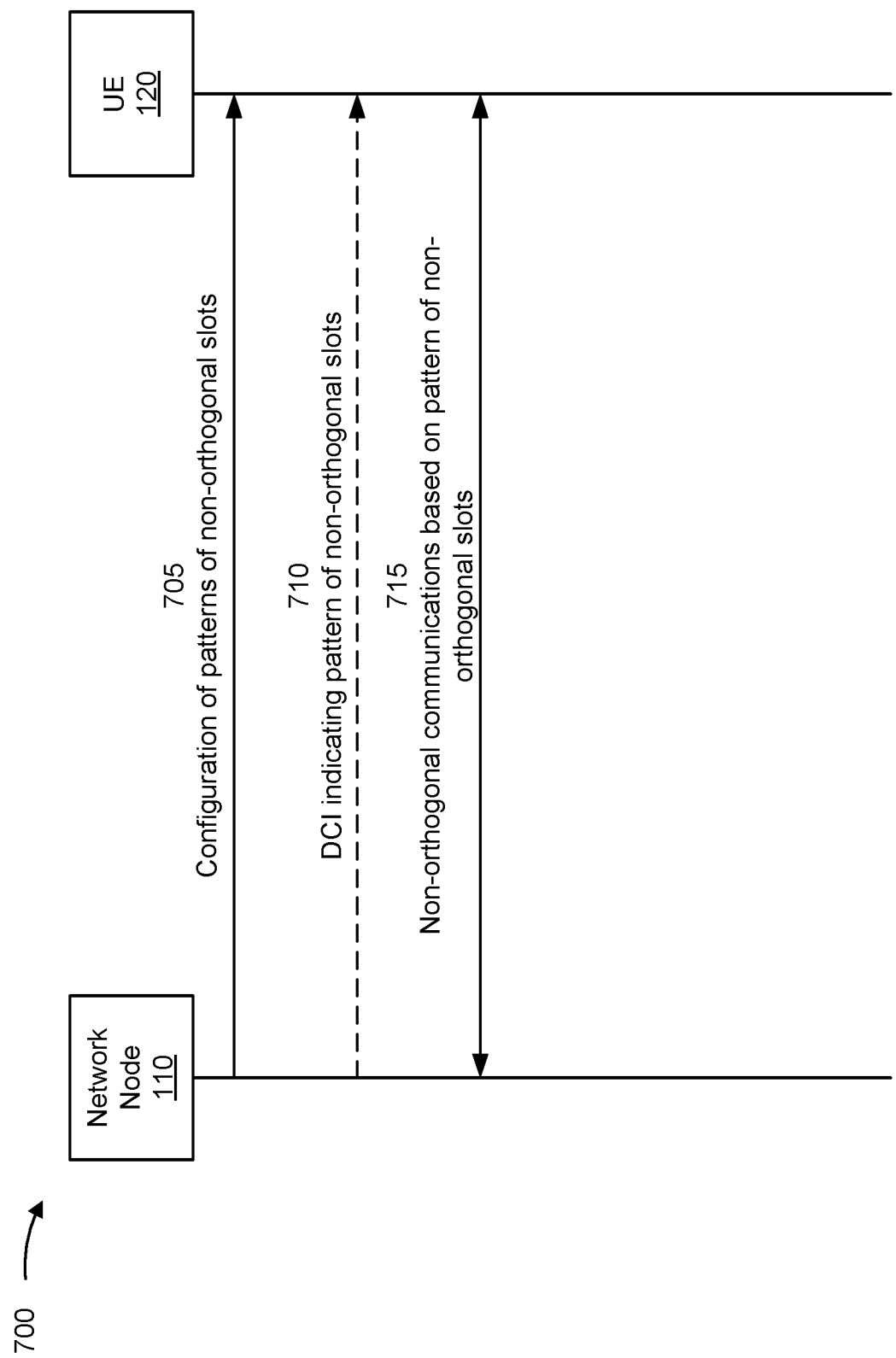

DOWNLINK CONTROL INFORMATION SCHEDULING MULTIPLE DOWNLINK OR UPLINK COMMUNICATIONS

FIELD OF THE DISCLOSURE

Aspects of the present disclosure generally relate to wireless communication and to techniques and apparatuses for downlink control information (DCI) scheduling multiple downlink or uplink communications.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE) for wireless communication. The UE may include a memory and one or more processors coupled to the memory. The one or more processors may be configured to receive, from a network node, downlink control information (DCI) that schedules multiple communications for each of one or more UEs in a group of UEs, the one or more UEs including the UE. The one or more processors may be configured to communicate with the network node based at least in part on the multiple communications scheduled for the UE in the DCI.

Some aspects described herein relate to a network node for wireless communication. The network node may include a memory and one or more processors coupled to the memory. The one or more processors may be configured to transmit DCI that schedules multiple communications for each of one or more UEs in a group of UEs. The one or more processors may be configured to communicate with the one or more UEs based at least in part on the multiple communications scheduled for each of the one or more UEs in the DCI.

Some aspects described herein relate to a method of wireless communication performed by a UE. The method may include receiving, from a network node, DCI that schedules multiple communications for each of one or more UEs in a group of UEs, the one or more UEs including the UE. The method may include communicating with the network node based at least in part on the multiple communications scheduled for the UE in the DCI.

Some aspects described herein relate to a method of wireless communication performed by a network node. The method may include transmitting DCI that schedules multiple communications for each of one or more UEs in a group of UEs. The method may include communicating with the one or more UEs based at least in part on the multiple communications scheduled for each of the one or more UEs in the DCI.

Some aspects described herein relate to a non-transitory computer-readable medium that stores a set of instructions for wireless communication by a UE. The set of instructions, when executed by one or more processors of the UE, may cause the UE to receive, from a network node, DCI that schedules multiple communications for each of one or more UEs in a group of UEs, the one or more UEs including the UE. The set of instructions, when executed by one or more processors of the UE, may cause the UE to communicate with the network node based at least in part on the multiple communications scheduled for the UE in the DCI.

Some aspects described herein relate to a non-transitory computer-readable medium that stores a set of instructions for wireless communication by a network node. The set of instructions, when executed by one or more processors of the network node, may cause the network node to transmit DCI that schedules multiple communications for each of one or more UEs in a group of UEs. The set of instructions, when executed by one or more processors of the network node, may cause the network node to communicate with the one or more UEs based at least in part on the multiple communications scheduled for each of the one or more UEs in the DCI.

Some aspects described herein relate to an apparatus for wireless communication. The apparatus may include means for receiving, from a network node, DCI that schedules multiple communications for each of one or more UEs in a group of UEs. The apparatus may include means for communicating with the network node based at least in part on the multiple communications scheduled the DCI.

Some aspects described herein relate to an apparatus for wireless communication. The apparatus may include means for transmitting DCI that schedules multiple communications for each of one or more UEs in a group of UEs. The apparatus may include means for communicating with the one or more UEs based at least in part on the multiple communications scheduled for each of the one or more UEs in the DCI.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 7 is a diagram illustrating an example associated with non-orthogonal downlink or uplink communications, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
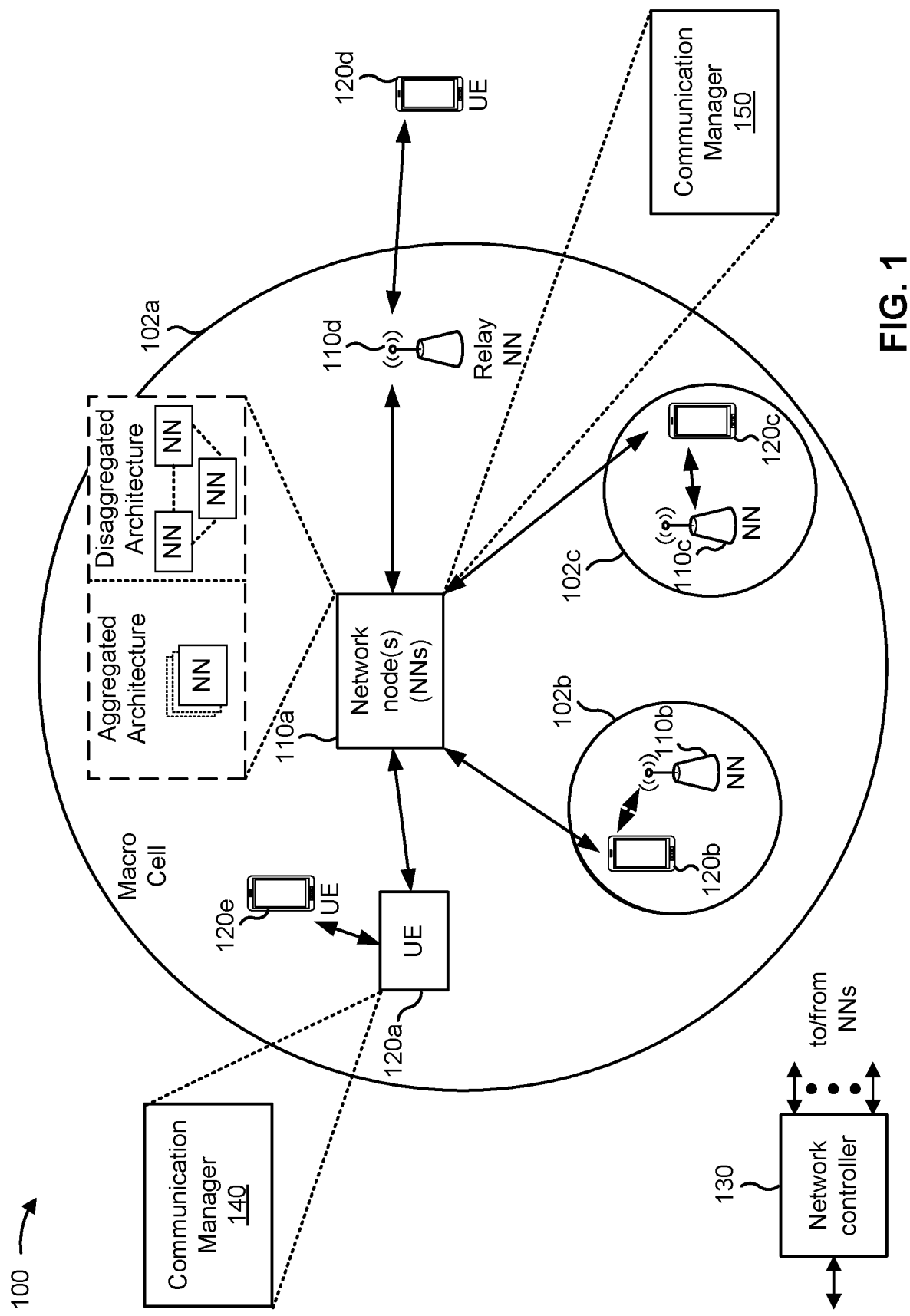
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., the UE 120) may include a communication manager 140. As described in more detail elsewhere herein, the communication manager 140 may receive, from a network node, downlink control information (DCI) that schedules multiple communications for each of one or more UEs in a group of UEs, the one or more UEs including the UE; and communicate with the network node based at least in part on the multiple communications scheduled for the UE in the DCI. Additionally, or alternatively, the communication manager 140 may perform one or more other operations described herein.

In some aspects, a network node (e.g., the network node 110) may include a communication manager 150. As described in more detail elsewhere herein, the communication manager 150 may transmit DCI that schedules multiple communications for each of one or more UEs in a group of UEs; and communicate with the one or more UEs based at least in part on the multiple communications scheduled for each of the one or more UEs in the DCI. Additionally, or alternatively, the communication manager 150 may perform one or more other operations described herein.

As indicated above, FIG. 1 is provided as an example. Other examples may differ from what is described with regard to FIG. 1.

Figure 2:
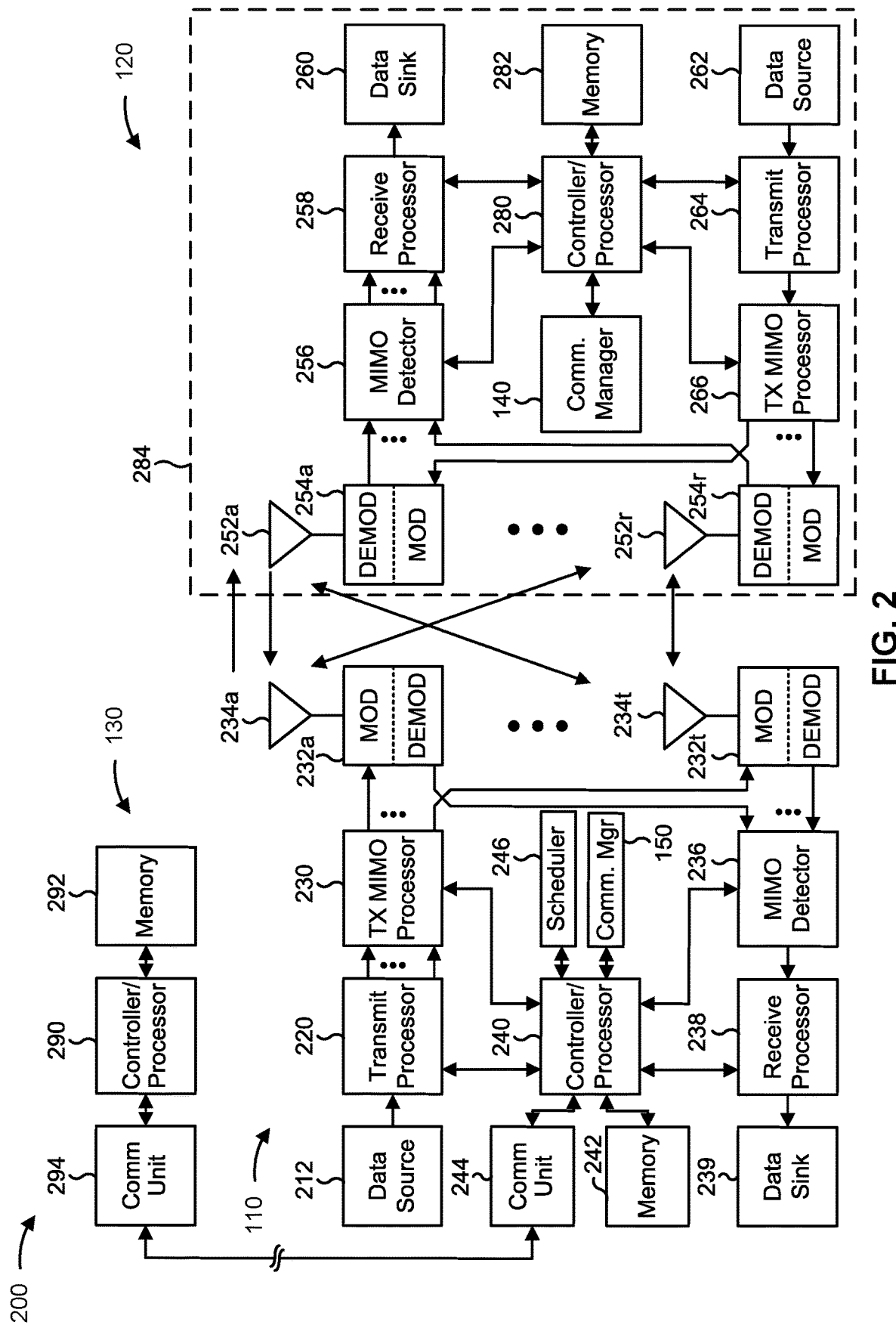
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-11).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-11).

The controller/processor 240 of the network node 110, the controller/processor 280 of the UE 120, and/or any other component(s) of FIG. 2 may perform one or more techniques associated with DCI scheduling multiple downlink or uplink communications, as described in more detail elsewhere herein. For example, the controller/processor 240 of the network node 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, a UE (e.g., the UE 120) includes means for receiving, from a network node, DCI that schedules multiple communications for each of one or more UEs in a group of UEs, the one or more UEs including the UE; and/or means for communicating with the network node based at least in part on the multiple communications scheduled for the UE in the DCI. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., the network node 110) includes means for transmitting DCI that schedules multiple communications for each of one or more UEs in a group of UEs; and/or means for communicating with the one or more UEs based at least in part on the multiple communications scheduled for each of the one or more UEs in the DCI. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
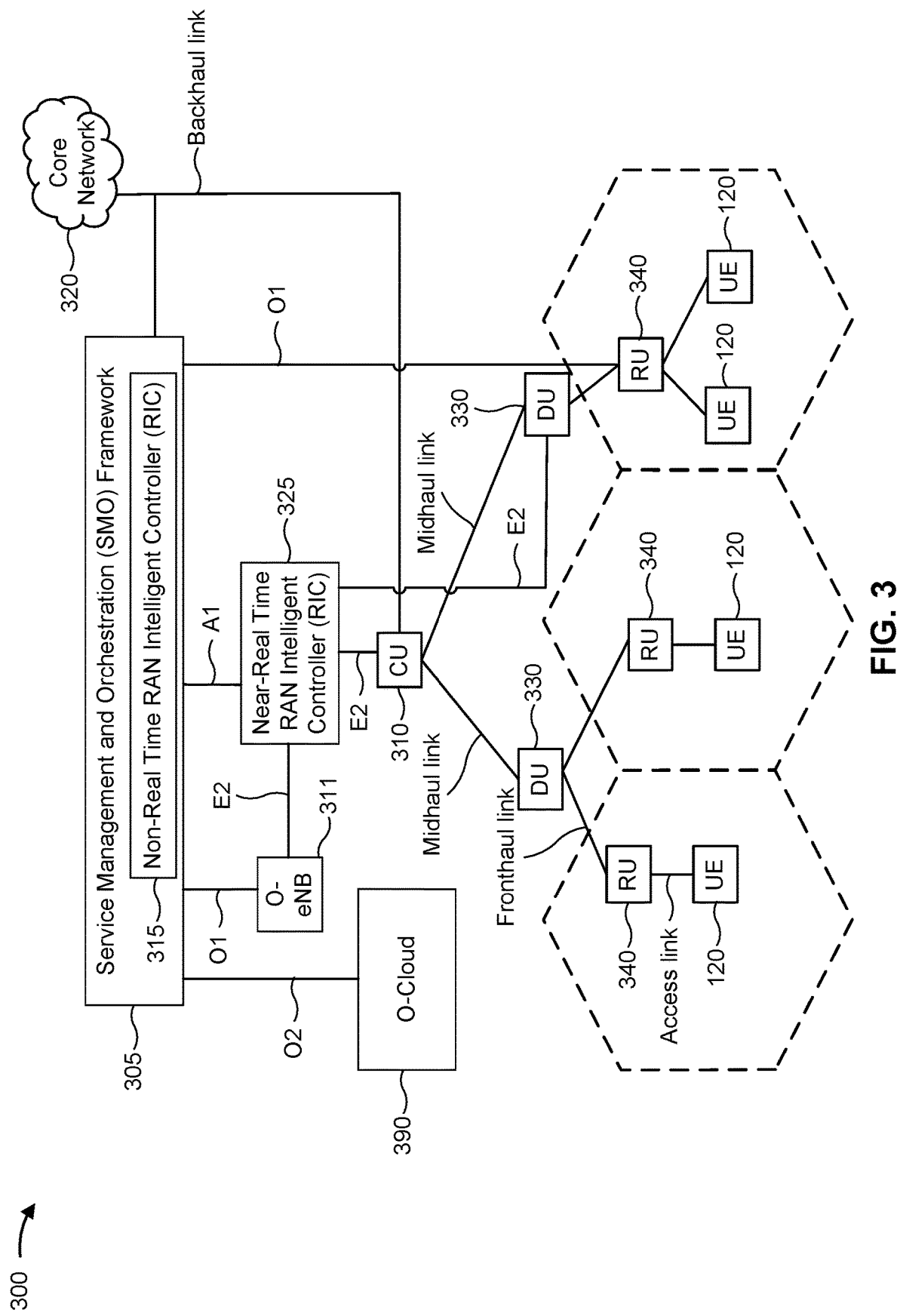
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
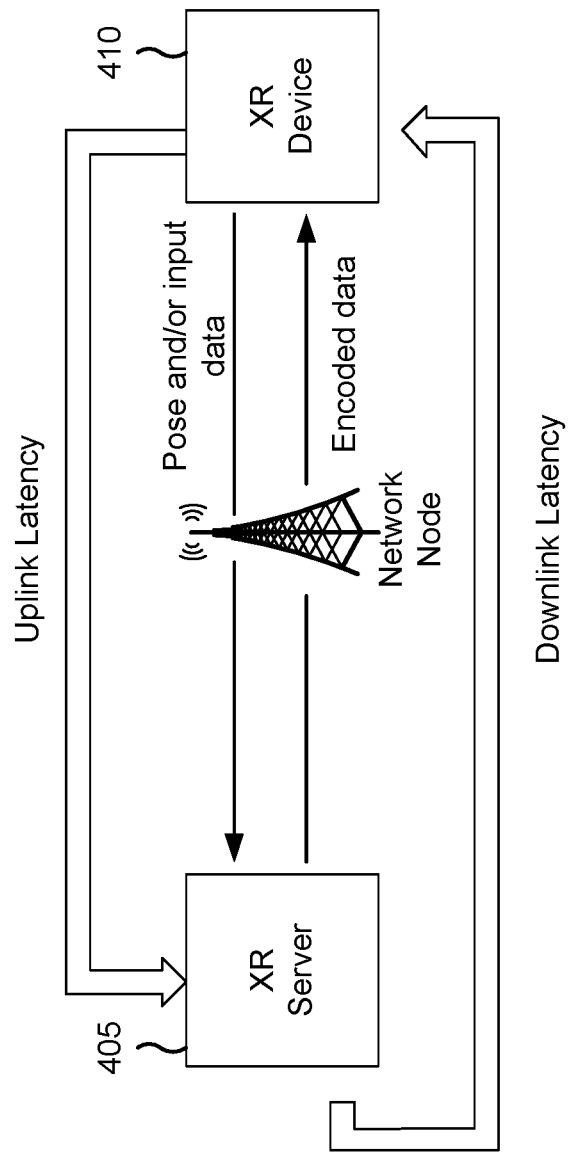
FIG. 4 is a diagram illustrating an example of a split-rendering extended reality (XR) system, in accordance with the present disclosure.

FIG. 4 is a diagram illustrating an example 400 of a split-rendering extended reality (XR) system, in accordance with the present disclosure. XR is an umbrella term encapsulating augmented reality (AR), virtual reality (VR), mixed reality (MR), or any combination thereof. As shown in FIG. 4, in the split-rendering XR (or "splitXR") system, rendering for a scene on an XR display is split between an XR server 405 and an XR device 410 that includes the XR display. For example, on-device rendering and perception processing, on the XR device 410, may be augmented by graphics rendering by the XR server via wireless network (e.g., 5G) communications. The XR server 405 may be an application server that serves an application client running on the XR device 410. In some aspects, the XR server 405 may be an edge server (or an edge cloud) connected to a network node (e.g., network node 110), such as a 5G/NR base station. The XR device may be a UE (e.g., UE 120), may be included in a UE, or may include a UE. In some aspects, the XR device may include a wearable XR headset.

As shown in FIG. 4, the XR device 410 may transmit uplink data, including user pose data and/or input data, to the XR server 405 via the network node. The user pose data may include a current pose of the XR device. For example, the user pose data may include a six degree of freedom (6-DoF) or three degree of freedom (3-DoF) pose of the XR headset, which may be tracked by sensors on the XR headset. Additionally, and/or alternatively, the uplink data may include input data, such as controller input from an XR controller. The transmission rate of the pose and controller data may be the same as a video frame rate (e.g., 90 Hz). In this case, the XR server 405 and the XR device 410 may render each video frame, displayed on a display of the XR device 410, based on the latest pose information.

The XR server 405, based at least in part on the latest pose information received in the uplink data, may generate an XR scene (e.g., an updated XR scene) and perform XR viewport pre-rendering rasterization of the XR scene. The XR server 405 may then encode the pre-rendered XR viewport as 2D media and transmit the encoded data (e.g., the 2D media for the pre-rendered viewport) to the XR device 410 via the network node (e.g., as downlink data). The XR device 410 may decode the 2D media, render the XR viewport using Asynchronous TimeWarp (ATW) rendering based on the latest pose tracking information, and display the rendered XR viewport for the updated scene of the display of the XR device 410.

To provide a good user experience, the delay from user motion to the updated scene being displayed on the display device may be minimized. In the splitXR system, this delay may correspond to the motion-to-render-to-photon (M2R2P) time. Here, "photon" refers to the display device. The M2R2P time may be equal to a sum of a 5G round trip time (5G-RTT), a client multimedia processing time (e.g., the processing time of the XR device 410), and the server multimedia processing time (e.g., the processing time of the XR server 405). The 5G-RTT may be equal to the sum of an uplink latency associated with transmitting the uplink data from the XR device 410 to the XR server 405 and a downlink latency associated with transmitting the downlink data from the XR server 405 to the XR device 410.

As indicated above, FIG. 4 is provided as an example. Other examples may differ from what is described with respect to FIG. 4.

Figure 5:
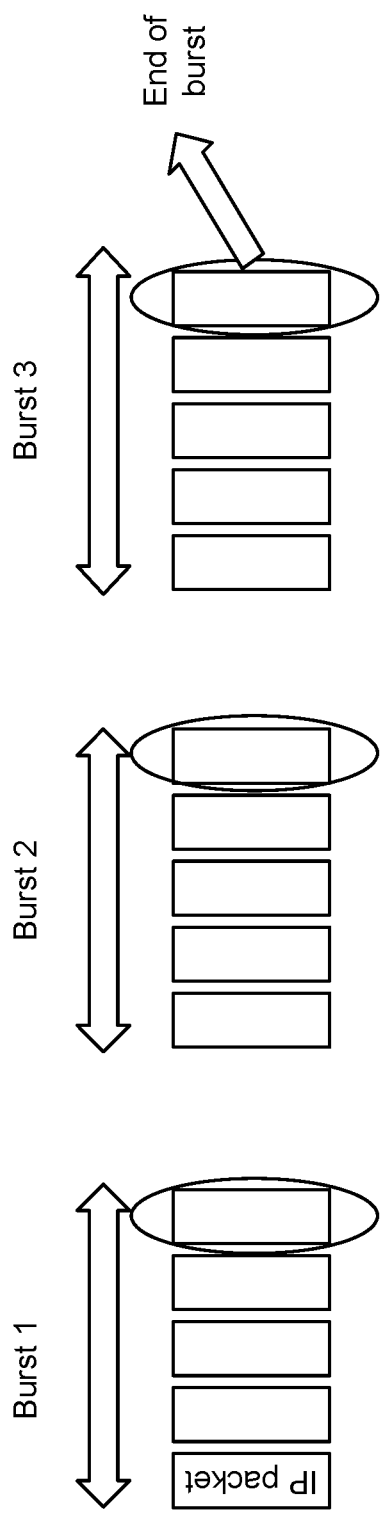
FIG. 5 is a diagram illustrating an example of XR traffic, in accordance with the present disclosure.

FIG. 5 is a diagram illustrating an example 500 of XR traffic, in accordance with the present disclosure.

As shown in FIG. 5, XR traffic may be communicated between a UE and a network node via traffic bursts (shown as Burst 1, Burst 2, and Burst 3 in FIG. 5). A traffic burst may include one or more packets (e.g., Internet Protocol (IP) packets) of XR data generated by an XR application (e.g., on a UE/XR device) or an XR server at roughly the same time (e.g., within a certain time window). XR traffic may include uplink traffic bursts (e.g., bursts of uplink traffic) and downlink traffic bursts (e.g., bursts of downlink traffic). The traffic bursts shown in FIG. 5 may be uplink traffic bursts or downlink traffic bursts.

In some examples, uplink resources for transmitting uplink traffic bursts to a network node and downlink resources for receiving downlink traffic bursts from the network node may be scheduled for a UE based at least in part on an expected traffic pattern associated with an XR application. The expected traffic pattern may correspond to expected traffic arrivals of uplink traffic and downlink traffic associated with an XR application. As used herein, "traffic arrival" refers to the arrival of data to be transmitted in a buffer of a wireless network device (e.g., a UE or a network node). For example, in a split XR system, the arrival of an uplink traffic burst may occur when uplink data (e.g., pose and/or control information) is output by an XR application server to a buffer of a UE/XR device to be transmitted to the XR server via the network node. In such a split XR system, the arrival of a downlink traffic burst may occur when downlink data (e.g., encoded 2D media for a pre-rendered scene or other video, audio, and/or haptic data) is output by the XR server and arrives in a buffer of the network node to be transmitted to the UE/XR device. In some examples, the expected traffic pattern for the XR traffic may be based at least in part on the video frame rate of the XR application on the UE/XR device.

As indicated above, FIG. 5 is provided as an example. Other examples may differ from what is described with respect to FIG. 5.

In some examples, a single DCI may schedule multiple uplink communications for a UE. For example, a single DCI (e.g., DCI 0_1) may schedule (or grant) multiple physical uplink shared channel (PUSCH) communications for a UE. That is, a single DCI may define resources for multiple PUSCH communications. Such scheduling of multiple PUSCH communications by a single DCI may be referred to as "multi-PUSCH scheduling." In the case of an XR system, a network node may use a single DCI to schedule/grant multiple PUSCH communications for transmission of an uplink traffic burst (or multiple uplink traffic bursts) by the UE. In some examples, a plurality of PUSCH communications may be scheduled by a single DCI, and each PUSCH communication may carry a separate (e.g., different) transport block (TB). Each TB may be mapped to at most one slot or one mini-slot. Multiple starting positions, in one or multiple slots, may be allowed for the multiple PUSCH communications scheduled by a single uplink grant (e.g., a single DCI). In some examples, the DCI (e.g., DCI 0_1) may include a list of time domain resource allocations (TDRAs) for the multiple PUSCH communications scheduled by the DCI. In some examples, a maximum number of PUSCH communications that can be scheduled by a single DCI may be eight. In some examples, the UE may transmit, to the network node, UE capability information that indicates whether the UE supports scheduling up to eight PUSCH communications with a single DCI.

In some examples, a single DCI may schedule multiple downlink communications for a UE. For example, a single DCI may schedule multiple physical downlink shared channel (PDSCH) communications for a UE. That is, a single DCI may define resources for multiple PDSCH communications to be received by the UE. Such scheduling of multiple PDSCH communications by single DCI may be referred to as "multi-PDSCH scheduling." In the case of an XR system, a network node may use a single DCI to schedule multiple PDSCH communications for transmission of a downlink traffic burst (or multiple downlink traffic bursts) to the UE. In some examples, a plurality of PDSCH communications may be scheduled by a single DCI, and each PDSCH communication may carry a separate (e.g., different) TB. Each TB may be mapped to at most one slot or one mini-slot. The DCI may include a list of TDRAs for the multiple PDSCH communications scheduled by the DCI. In some examples, a maximum number of PDSCH communications that can be scheduled by a single DCI may be eight.

Multi-PUSCH scheduling and/or multi-PDSCH scheduling for communications between a UE and a network node may reduce control signaling overhead and UE power consumption, as compared to separate DCI for scheduling each PUSCH communication and/or PDSCH communication, particularly in an XR system in which XR traffic is communicated (e.g., in traffic bursts) between the UE and the network node. For example, the UE power consumption may be reduced due to fewer scheduling request (SR) transmissions by the UE (e.g., to request uplink grants for PUSCH communications) and/or reduced monitoring and decoding of DCI by the UE.

In some cases, a network node may schedule downlink communications and uplink communications for multiple UEs. For example, in an XR system, a network node may schedule PUSCH communications (e.g., for uplink traffic bursts) and PDSCH communications (e.g., for downlink traffic bursts) for multiple XR UEs. However, unicast DCI is used for multi-PUSCH scheduling and multi-PDSCH scheduling, such that a single DCI transmission schedules multiple PUSCH communications or multiple PDSCH communications for a single UE. Furthermore, different DCI types are used for multi-PUSCH scheduling and multi-PDSCH scheduling, such that the network node may transmit separate transmissions of multi-PUSCH scheduling DCI and multi-PDSCH scheduling DCI for each UE. As a result, the control signaling overhead for scheduling communications with multiple UEs (e.g., communications of XR traffic for multiple XR UEs) may be large, which may result in increased latency for the communications between the UEs and the network node.

Some techniques and apparatuses described herein enable a network node to transmit DCI that schedules multiple communications (e.g., multiple downlink communications and/or multiple uplink communications) for each UE of a group of UEs. A UE, of the group of UEs, may receive the DCI that schedules the multiple communications for each UE of the group of UEs. The UE may communicate with the network node based at least in part on the multiple communications scheduled for the UE in the DCI. As a result, a control signaling overhead is reduced, as compared with the network node transmitting separate DCI to each UE of the group of UEs, and such reduced control signaling overhead may increase more available network resources and/or decrease latency for communications between the UEs and the network node.

In some aspects, a network node may transmit DCI that schedules multiple downlink communications and multiple uplink communications for a UE. The UE may receive the DCI, and the UE may communicate with the network node based at least in part on the multiple downlink communications and the multiple uplink communications scheduled for the UE in the DCI. As a result, a signaling overhead is reduced, as compared with the network node transmitting separate DCI for scheduling the multiple downlink communications and the multiple uplink communications for the UE, and such reduced control signaling overhead may decrease latency for communications between the UE and the network node, increase flexibility of scheduling the multiple downlink communications and the multiple uplink communications for the UE, and/or reduce UE power consumption (e.g., due to reduced monitoring and decoding of DCI by the UE).

Figure 6A:
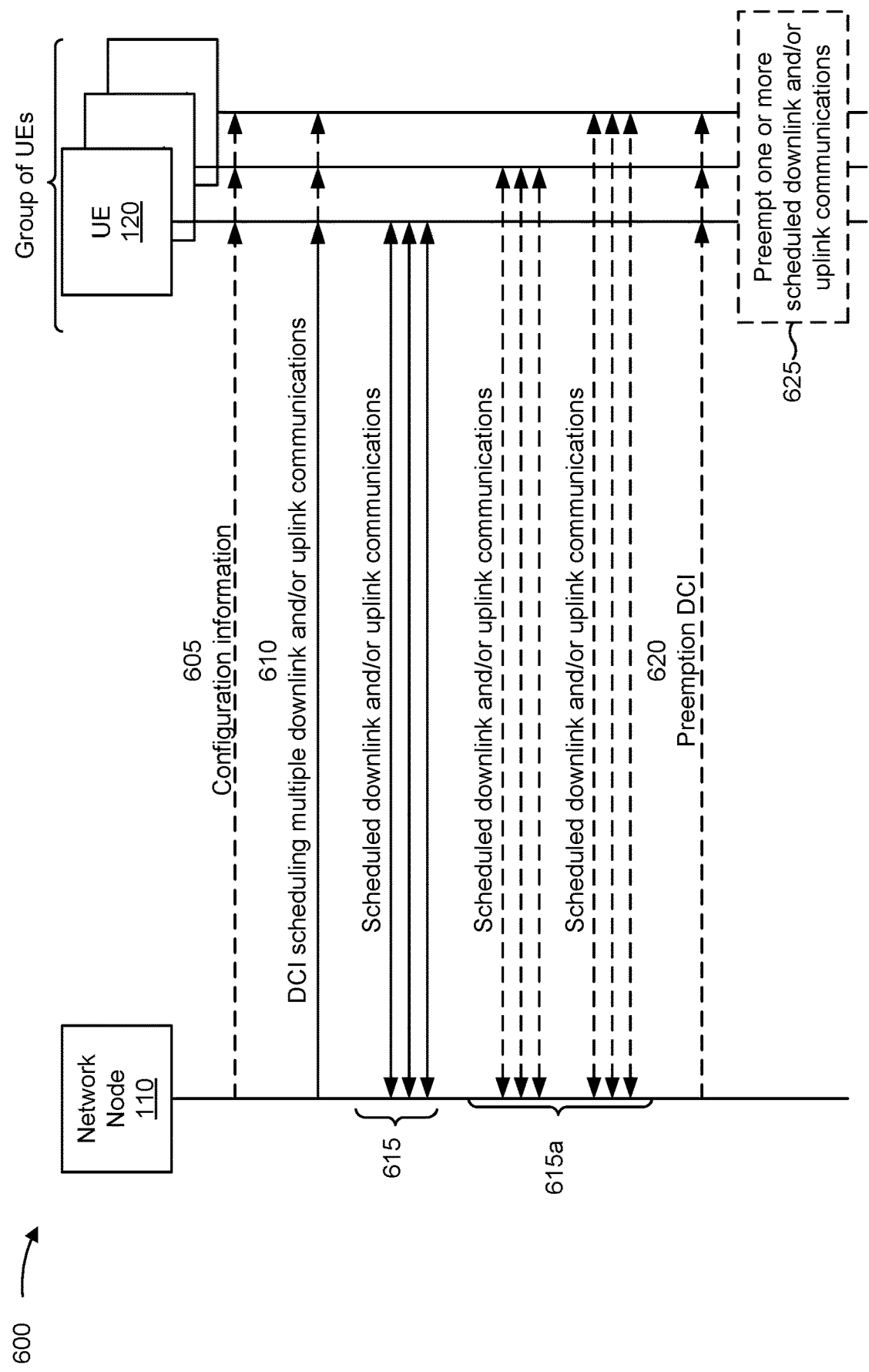
FIGS. 6A-6D are diagrams illustrating an example associated with downlink control information (DCI) scheduling multiple downlink or uplink communications, in accordance with the present disclosure.

FIGS. 6A-6D are diagrams illustrating an example 600 associated with DCI scheduling multiple downlink or uplink communications, in accordance with the present disclosure. As shown in FIG. 6A, example 600 includes communication between a network node 110 and a UE 120. In some aspects, the network node 110 and the UE 120 may be included in a wireless network, such as wireless network 100. The network node 110 and the UE 120 may communicate via a wireless access link, which may include an uplink and a downlink. In some aspects, the network node 110 may communicate with a group of UEs that includes the UE 120.

In some aspects, the UE 120 may be an XR UE associated with an XR application. That is, the UE 120 may be, include, or be included in an XR device (e.g., XR device 410). In some aspects, the group of UEs may include a group of XR UEs associated with an XR application. For example, each UE of the group of UEs may be, include, or be included in an XR device (e.g., XR device 410). In some aspects, the network node may communicate XR traffic between an XR server (e.g., XR server 405) and the XR UEs (e.g., the UE 120 and/or other UEs in the group of UEs). For example, the network node 110 may receive uplink XR traffic from the XR UEs and transmit the uplink XR traffic to the XR server, and the network node may receive downlink XR traffic from the XR server and transmit the downlink XR traffic to the XR UEs.

As shown in FIG. 6A, and by reference number 605, the network node 110 may transmit, and the UE 120 may receive, configuration information. In some aspects, the group of UEs may receive the configuration information. For example, each UE in the group of UEs may receive the configuration information. The configuration information may indicate a configuration associated with a group common DCI for scheduling multiple downlink and/or uplink communications for the group of UEs. For example, the configuration information may indicate at least one of a configuration associated with a group common DCI for scheduling multiple downlink (e.g., PDSCH) communications for the group of UEs, a configuration associated with a group common DCI for scheduling multiple uplink (e.g., PUSCH) communications for the group of UEs, or a configuration associated with a group common DCI for scheduling multiple downlink (e.g., PDSCH) communications and multiple uplink (e.g., PUSCH) communications for the group of UEs.

In some aspects, the configuration information received by each UE of the group of UEs may indicate a location of a respective scheduling information block in the group common DCI for that UE. The respective scheduling information block for a UE may be a block of fields in the group common DCI that indicates an allocation of resources for multiple communications (e.g., multiple PDSCH communications or multiple PUSCH communications) scheduled for that UE. In some aspects, the configuration information received by each UE of the group of UEs may indicate the locations of the respective scheduling information blocks for all of the UEs of the group of UEs. In some aspects, the configuration information may include information associated with a UE in the group of UEs determining a starting location of the respective scheduling information block for that UE in the group common DCI. For example, the configuration information may include information that enables a UE in the group of UEs to determine the starting location of the respective scheduling information block based at least in part on a UE identifier (ID) associated with the UE.

In some aspects, the configuration information received by each UE of the group of UEs may indicate a location of two respective scheduling information blocks in the group common DCI for that UE. The two respective scheduling information blocks for a UE may include a first scheduling information block (e.g., a first block of fields in the group common DCI) that indicates an allocation of resources for multiple downlink communications (e.g., multiple PDSCH communications) scheduled for that UE and a second scheduling information block (e.g., a second block of fields in the group common DCI) that indicates an allocation of resources for multiple uplink communications (e.g., multiple PUSCH communications) scheduled for that UE. In some aspects, the configuration information received by each UE of the group of UEs may indicate the locations of the two respective scheduling information blocks for all of the UEs of the group of UEs. In some aspects, the configuration information may include information associated with a UE in the group of UEs determining starting locations of the two respective scheduling information blocks for that UE in the group common DCI. For example, the configuration information may include information that enables a UE in the group of UEs to determine the starting locations of the two respective scheduling information blocks for the UE based at least in part on a UE ID associated with the UE.

In some aspects, the configuration information may indicate multiple patterns of slots for non-orthogonal communications, as described in connection with FIG. 7.

As further shown in FIG. 6A, and by reference number 610, the network node 110 may transmit, and the UE 120 may receive, a DCI message that includes DCI scheduling multiple downlink and/or uplink communications for the UE 120. In some aspects, the DCI message may include DCI scheduling multiple downlink and/or uplink communications for each of one or more UEs (e.g., including the UE 120) in the group of UEs. In this case, the network node 110 may transmit, and the group of UEs may receive, the DCI message. For example, each UE in the group of UEs may receive the DCI message. The DCI message may be a transmission of DCI via a physical downlink control channel (PDCCH) communication.

In some aspects, the DCI may be group common DCI that schedules multiple downlink (e.g., PDSCH) communications for each of one or more UEs in the group of UEs. For example, the group common DCI may be a single DCI (e.g., transmitted in a single DCI message) that schedules multiple downlink (e.g., PDSCH) communications for multiple UEs in the group of UEs. In this case, the group common DCI may schedule multiple downlink (e.g., PDSCH) communications for all or a subset of the group of UEs. The network node 110 may determine respective PDSCH allocations for different UEs in the group of UEs, and the network node 110 may indicate the respective PDSCH allocations in the group common DCI. In some aspects, the group common DCI may be scrambled by a group-specific radio network temporary identifier (RNTI) for group-based scheduling of multiple downlink (e.g., PDSCH) communications. The UEs (e.g., the UE 120 and the other UEs in the group of UEs) may monitor for DCI scrambled by the RNTI for group-based scheduling of multiple downlink communications, and the UEs may determine that the group common DCI is for the group of UEs based at least in part on the RNTI used to scramble the group common DCI corresponding to an RNTI associated with the group of UEs.

In some aspects, the DCI may be group common DCI that schedules multiple uplink (e.g., PUSCH) communications for each of one or more UEs in the group of UEs. For example, the group common DCI may be a single DCI (e.g., transmitted in a single DCI message) that schedules multiple uplink (e.g., PUSCH) communications for multiple UEs in the group of UEs. In this case, the group common DCI may schedule multiple uplink (e.g., PUSCH) communications for all or a subset of the group of UEs. The network node 110 may determine respective PUSCH allocations for different UEs in the group of UEs, and the network node 110 may indicate the respective PUSCH allocations in the group common DCI. In some aspects, the group common DCI may be scrambled by a group-specific RNTI for group-based scheduling of multiple uplink (e.g., PUSCH) communications. The UEs (e.g., the UE 120 and the other UEs in the group of UEs) may monitor for DCI scrambled by the RNTI for group-based scheduling of multiple uplink communications, and the UEs may determine that the group common DCI is for the group of UEs based at least in part on the RNTI used to scramble the group common DCI corresponding to an RNTI associated with the group of UEs.

Figure 6B:
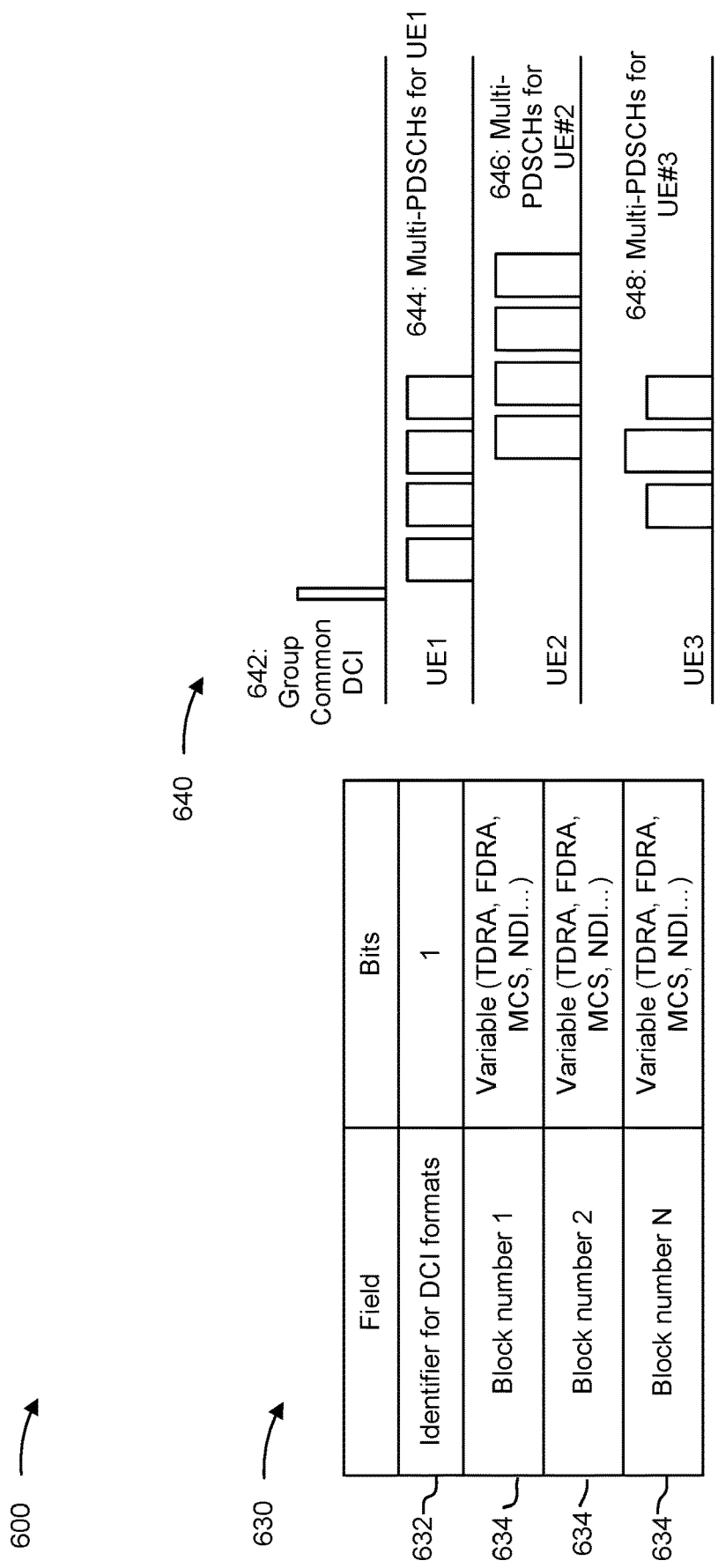

As shown in FIG. 6B, and by reference number 630, group common DCI for scheduling multiple downlink (e.g., PDSCH) communications or multiple uplink (e.g., PUSCH) communications may include a DCI format identifier field 632 and N scheduling information blocks 634 (e.g., Block number 1, Block number 2, . . . , Block number N). The DCI format identifier field 632 may be a one-bit field that indicates a DCI format of the group common DCI. For example, the DCI format may be a DCI format associated with scheduling multiple downlink (e.g., PDSCH) communications for a group of UEs or a DCI format associated with scheduling multiple uplink (e.g., PUSCH) communications for a group of UEs. Each scheduling information block 634 may be associated with a respective UE in the group of UEs.

In some aspects, the N scheduling information blocks 634 may include a respective scheduling information block 634 for each UE in the group of UEs. The group of UEs scheduled by the group common DCI may be higher layer configured with the respective scheduling information blocks 634 in the group common DCI that indicate respective PDSCH or PUSCH resource allocations for the group of UEs. For example, as described above in connection with reference number 605, the configuration information may indicate the location of the respective scheduling information block 634 in the group common DCI for each UE in the group of UEs. Alternatively, the starting position of the respective scheduling information block 634 in the group common DCI for a UE may be determined by higher layer configuration. In some aspects, the N scheduling information blocks 634 may include a respective scheduling information block 634 for N UEs, in the group of UEs, for which the downlink or uplink communications are scheduled. In this case, each of the N UEs may determine the starting location of the respective scheduling information block 634 based at least in part on the configuration information associated with determining the starting location of the respective scheduling information block in the group common DCI.

Each scheduling information block 634 may include a set of fields that indicate an allocation of resources for multiple communications scheduled for the respective UE associated with that scheduling information block 634. For example, the set of fields included in a scheduling information block 634 may indicate a TDRA, a frequency domain resource allocation (FDRA), an MCS, and a new data indicator (NDI) for the multiple downlink (e.g., PDSCH) communications or the multiple uplink (e.g., PUSCH) communications scheduled for the respective UE. The scheduling information block 634 may indicate some scheduling information (e.g., TDRA) for each communication scheduled for the respective UE, and the scheduling information block 634 may indicate other information that applies to all of the communications scheduled for the respective UE by the group common DCI. In some aspects, each scheduling information block 634 in the group common DCI for scheduling multiple PDSCH communications for the group of UEs may include all or a subset of fields included in the unicast DCI for scheduling multiple PDSCH communications for a single UE. In some aspects, each scheduling information block 634 in the group common DCI for scheduling multiple PUSCH communications for the group of UEs may include all or a subset of fields included in the unicast DCI for scheduling multiple PUSCH communications for a single UE.

FIG. 6B shows an example 640 of a group common DCI scheduling multiple PDSCH communications for multiple UEs. As shown by reference number 642, a network node (e.g., the network node 110) may transmit the group common DCI to a group of UEs including a first UE (UE1), a second UE (UE2), and a third UE (UE3). As shown by reference number 644, the group common DCI schedules multiple PDSCH communications for UE1. For example, the group common DCI schedules four PDSCH communications to be received by UE1 in respective PDSCH communication occasions. A PDSCH communication occasion corresponds to the PDSCH resources (e.g., time and/or frequency resources) allocated for a scheduled PDSCH communication. As shown by reference number 646, the group common DCI schedules multiple PDSCH communications for UE2. For example, the group common DCI schedules four PDSCH communications to be received by UE2 in respective PDSCH communication occasions. As shown by reference number 648, the group common DCI schedules multiple PDSCH communications for UE3. For example, the group common DCI schedules three PDSCH communications to be received by UE3 in respective PDSCH communication occasions.

Returning to FIG. 6A, in some aspects, the DCI message transmitted by the network node 110 and received by the UE 120 may include DCI that schedules multiple downlink communications and multiple uplink communications for the UE 120. In some aspects, the DCI that schedules multiple downlink communications and multiple uplink communications for the UE 120 may be unicast DCI included in a DCI message transmitted to the UE 120 from the network node 110. In this case, the unicast DCI may include a first set of fields (e.g., a first scheduling information block) that indicates a resource allocation for the multiple downlink communications scheduled for the UE 120 and a second set of fields (e.g., a second scheduling information block) that indicates a resource allocation for the multiple uplink communications scheduled for the UE 120.

In some aspects, the DCI that schedules multiple downlink communications and multiple uplink communications for the UE 120 may be group common DCI transmitted to (and received by) the group of UEs. In this case, the group common DCI may schedule multiple downlink (e.g., PDSCH) communications and/or multiple uplink (e.g., PUSCH) communications for multiple UEs of the group of UEs. For example, the group common DCI may indicate allocations of resources for downlink communications and allocations of resources for uplink communications for all or a subset of the group of UEs. In some aspects, the group common DCI may be scrambled by a group-specific RNTI for group-based scheduling of multiple downlink (e.g., PDSCH) and uplink (e.g., PUSCH) communications.

Figure 6C:
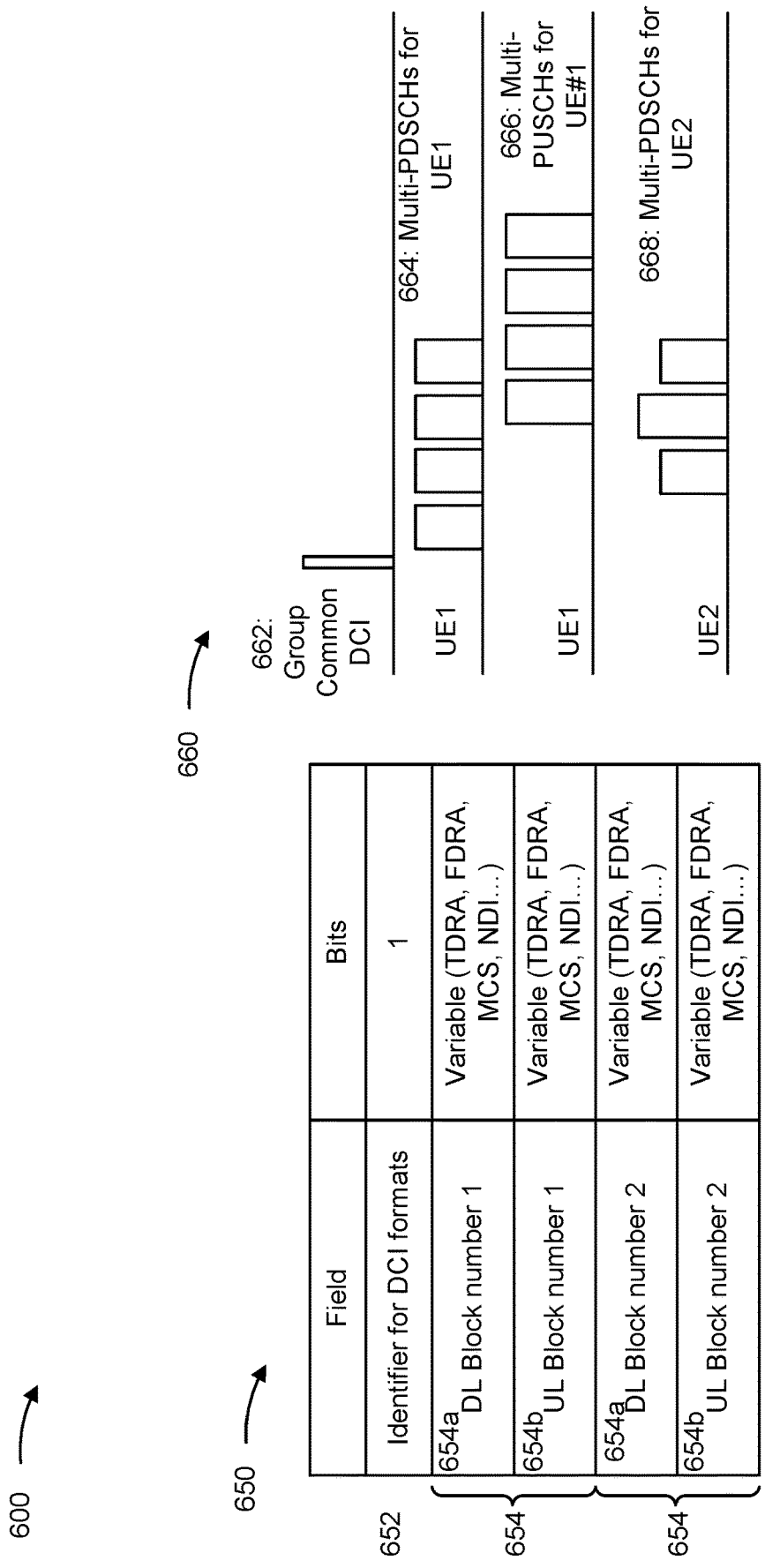

As shown in FIG. 6C, and by reference number 650, the group common DCI for scheduling multiple downlink (e.g., PDSCH) and uplink (e.g., PUSCH) communications for a group of UEs may include a DCI format identifier field 652. The DCI format identifier field 652 may be a one-bit field that indicates a DCI format of the group common DCI. For example, the DCI format may be a DCI format associated with scheduling multiple downlink (e.g., PDSCH) communications and multiple uplink (e.g., PUSCH) communications for a group of UEs. In some aspects, the group common DCI may include pairs of scheduling information blocks 654 for multiple UEs in the group of UEs (e.g., for all or a subset of the UEs in the group of UEs). The pair of scheduling information blocks for a UE may include a downlink scheduling information block 654*a* and an uplink scheduling information block 654*b*. For example, as shown in FIG. 6C, a first pair of scheduling information blocks 654 includes a first downlink scheduling information block 654*a* (shown as DL block number 1) for a first UE and a first uplink scheduling information block 654*b* (shown as UL block number 1) for the first UE, and a second pair of scheduling information blocks 654 includes a second downlink scheduling information block 654*a* (shown as DL block number 2) for a second UE and a first uplink scheduling information block 654*b* (shown as UL block number 2) for the second UE.

The group of UEs scheduled by the group common DCI may be higher layer configured with the respective pairs of scheduling information blocks 654 in the group common DCI that indicate respective PDSCH and PUSCH resource allocations for the group of UEs. For example, as described above in connection with reference number 605, the configuration information may indicate the locations of two respective scheduling information blocks in the group common DCI for each UE in the group of UEs. Alternatively, the starting positions of the respective pairs of scheduling information blocks 654 in the group common DCI for a UE may be determined by higher layer configuration indicated in the configuration information.

Each downlink scheduling information block 654*a* may include a set of fields (e.g., TDRA, FDRA, MCS, and/or NDI, among other examples) that indicate an allocation of resources for multiple PDSCH communications scheduled for the respective UE associated with that downlink scheduling information block 654*a*. In some aspects, each downlink scheduling information block 654*a* in the group common DCI for scheduling multiple PDSCH communications and multiple PUSCH communications for a group of UEs may include all or a subset of fields included in the unicast DCI for scheduling multiple PDSCH communications for a single UE. Each uplink scheduling information block 654*b* may include a set of fields (e.g., TDRA, FDRA, MCS, and/or NDI, among other examples) that indicate an allocation of resources for multiple PUSCH communications scheduled for the respective UE associated with that uplink scheduling information block 654*b*. In some aspects, each uplink scheduling information block 654*b* in the group common DCI for scheduling multiple PDSCH communications and multiple PUSCH communications for a group of UEs may include all or a subset of fields included in the unicast DCI for scheduling multiple PUSCH communications for a single UE.

FIG. 6C shows an example 660 of a group common DCI scheduling multiple PDSCH communications and/or PUSCH communications for multiple UEs. As shown by reference number 662, a network node (e.g., the network node 110) may transmit the group common DCI to a group of UEs including a first UE (UE1) and a second UE (UE2). As shown by reference number 664, the group common DCI schedules multiple PDSCH communications for UE1. For example, the group common DCI schedules four PDSCH communications to be received by UE1 in respective PDSCH communication occasions. As shown by reference number 666, the group common DCI schedules multiple PUSCH communications for UE1. For example, the group common DCI schedules four PUSCH communications to be transmitted by UE1 in respective PUSCH communication occasions. A PUSCH communication occasion corresponds to the PUSCH resources (e.g., time and/or frequency resources) allocated for a scheduled PUSCH communication. As shown by reference number 668, the group common DCI schedules multiple PDSCH communications for UE2. For example, the group common DCI schedules three PDSCH communications to be received by UE2 in respective PDSCH communication occasions.

Returning to FIG. 6A, as shown by reference number 615, the UE 120 and the network node 110 may communicate based at least in part on the multiple downlink and/or uplink communications scheduled for the UE 120 in the DCI. In some aspects, in a case in which multiple downlink (e.g., PDSCH) communications are scheduled for the UE 120 in the DCI (e.g., in group common DCI that schedules multiple downlink communications for one or more UEs in the group of UEs), the network node 110 may transmit, and the UE 120 may receive, the multiple downlink (PDSCH) communications scheduled for the UE 120 in the DCI. In some aspects, in a case in which multiple uplink (e.g., PUSCH) communications are scheduled for the UE 120 in the DCI (e.g., in group common DCI that schedules multiple uplink communications for one or more UEs in the group of UEs), the UE 120 may transmit, and the network node 110 may receive, the multiple uplink (PDSCH) communications scheduled for the UE 120 in the DCI.

In some aspects, the DCI (e.g., group common DCI or unicast DCI) may schedule multiple downlink (e.g., PDSCH) communications and multiple uplink (e.g., PUSCH) communications for the UE 120. In this case, the network node 110 may transmit, and the UE 120 may receive, the multiple downlink (PDSCH) communications scheduled for the UE 120 in the DCI. The UE 120 may transmit, and the network node 110 may receive, the multiple uplink (PDSCH) communications scheduled for the UE 120 in the DCI.

The DCI may schedule the multiple communications (e.g., multiple downlink and/or uplink communications) for the UE 120 in respective communication occasions. A communication occasion corresponds to the allocated resources (e.g., time and/or frequency resources) indicated in the DCI for the communication. In some aspects, the UE 120 may communicate with the network node 110 (e.g., transmit a scheduled uplink communication or receive a scheduled downlink communication) in all of the communication occasions scheduled for the UE 120 in the DCI. In other aspects, the UE 120 may communicate with the network node 110 (e.g., transmit a scheduled uplink communication or receive a scheduled downlink communication) in a subset of the communication occasions scheduled for the UE 120 in the DCI, for example based at least in part on the UE 120 receiving preemption DCI as described in greater detail below.

As further shown in FIG. 6A, and by reference number 615*a*, one or more other UEs in the group of UEs may communicate with the network node 110 based at least in part on multiple downlink communications and/or multiple uplink communications scheduled for the one or more other UEs in the DCI, similar to as described in connection with reference number 615 for the UE 120.

As further shown in FIG. 6A, and by reference number 620, the network node 110 may transmit, and the UE 120 may receive, preemption DCI. In some aspects, the network node 110 may transmit, and the group of UEs may receive, the preemption DCI. For example, each UE in the group of UEs may receive the preemption DCI. The preemption DCI may be transmitted via a PDCCH communication. In some aspects, the preemption DCI may be unicast from the network node 110 to a UE (e.g., the UE 120). In some aspects, the preemption DCI may be groupcast to the group of UEs. For example, the preemption DCI may be group common DCI transmitted to the group of UEs.

The preemption DCI may indicate preemption of one or more of the communications (e.g., downlink and/or uplink communications) scheduled by the scheduling DCI described above (e.g., the DCI that schedules the multiple downlink and/or uplink communications for the UE 120 and/or one or more other UEs in the group of UEs). The scheduling DCI may schedule multiple communications, for the UE 120 and/or one or more other UEs in the group of UEs, in respective communication occasions. In some aspects, the preemption DCI may indicate one or more preempted communication occasions among the communication occasions scheduled by the scheduling DCI. For example, the preemption DCI may indicate at least one preempted communication occasion among the respective communication occasions in which the multiple communications for the UE 120 are scheduled. Additionally, or alternatively, the preemption DCI may indicate one or more preempted communication occasions among the respective communication occasions in which the multiple communications for another UE, in the group of UEs, are scheduled. In some aspects, in a case in which the scheduling DCI schedules multiple downlink communications for the UE 120 in respective downlink communication occasions and multiple uplink communications for the UE 120 in respective uplink communication occasions, the preemption DCI may indicate at least one preempted downlink communication occasion among the respective downlink communication occasions scheduled for the UE 120 and/or at least one preempted uplink communication occasion among the respective uplink communication occasions scheduled for the UE 120.

In some aspects, the preemption DCI may indicate preemption of whole communication occasions scheduled for transmission of uplink data or reception of downlink data by a UE. In some aspects, the preemption DCI may indicate future allocations of resources scheduled for one or more UEs (e.g., for conserving UE power consumption), instead of, or in addition to, indication of cancelation of old received resources. For example, the DCI 2_1 may be modified to indicate future allocations of resources scheduled for one or more UEs.

As further shown in FIG. 6A, and by reference number 625, the UE 120 and/or one or more other UEs in the group of UEs may preempt one or more scheduled downlink and/or uplink communications based at least in part on the scheduled DCI. In some aspects, each UE for which at least one scheduled communication occasion is preempted by the preemption DCI may refrain from communicating with the network node 110 in the at least one communication occasion that is preempted. For example, based at least in part on the preemption DCI indicating one or more preempted communication occasions (e.g., one or more preempted downlink and/or uplink communication occasions) among the communication occasions scheduled for the UE 120 (e.g., the communication occasions in which the multiple communications for the UE 120 are scheduled), the UE 120 may refrain from communicating with the network node 110 in the one or more preempted communication occasions. In this case, the UE 120 may not transmit (and the network node 110 may not receive) a scheduled uplink communication that is scheduled in a preempted uplink communication occasion, and/or the UE 120 may not receive or monitor for (and the network node 110 may not transmit) a scheduled downlink communication that is scheduled in a preempted downlink communication occasion.

Figure 6D:
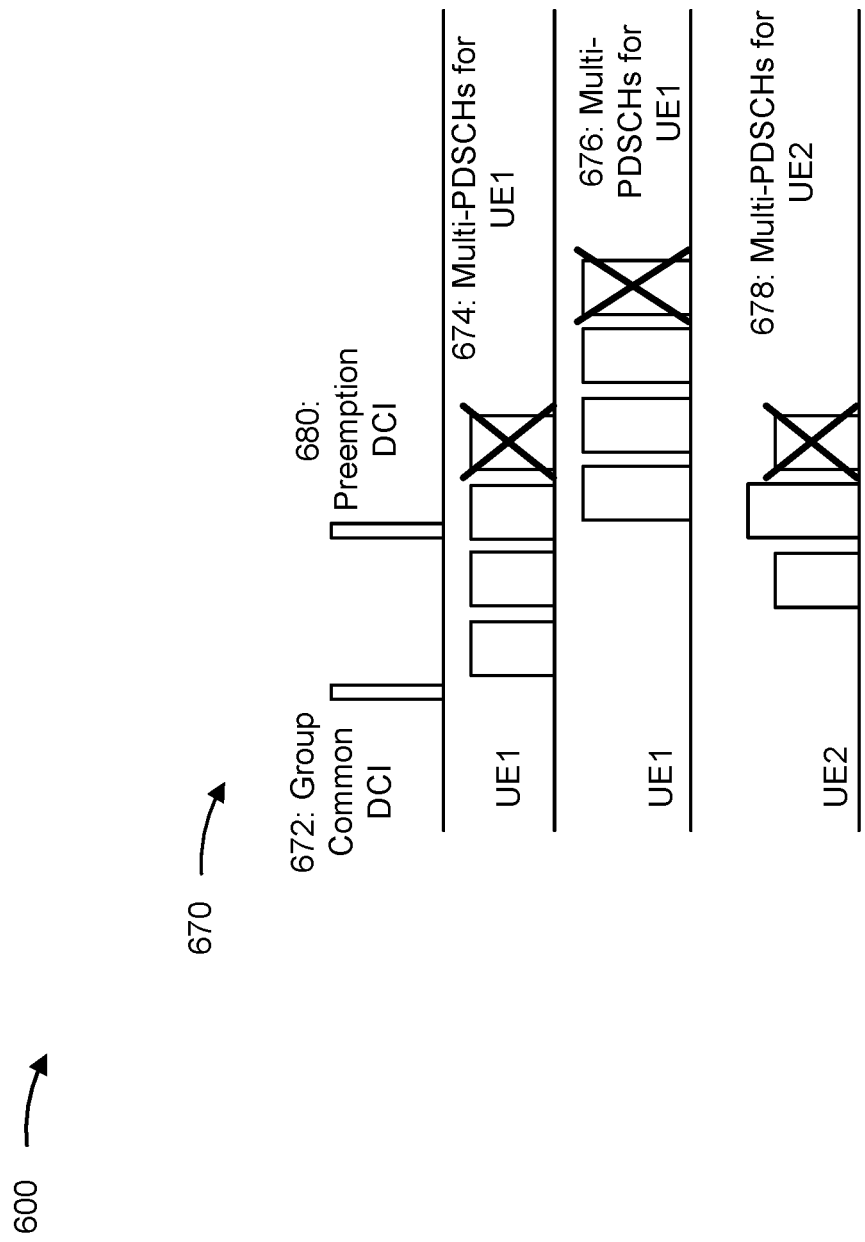

FIG. 6D shows an example 670 of preempting communications scheduled by DCI that schedules multiple downlink and/or uplink communications for multiple UEs. As shown by reference number 672, a network node (e.g., the network node 110) may transmit the group common DCI that schedules multiple PDSCH and/or PUSCH communications for multiple UEs to a group of UEs including a first UE (UE1) and a second UE (UE2). As shown by reference number 674, the group common DCI schedules multiple PDSCH communications for UE1. For example, the group common DCI schedules four PDSCH communications to be received by UE1 in respective PDSCH communication occasions. As shown by reference number 676, the group common DCI schedules multiple PUSCH communications for UE1. For example, the group common DCI schedules four PUSCH communications to be transmitted by UE1 in respective PUSCH communication occasions. As shown by reference number 678, the group common DCI schedules multiple PDSCH communications for UE2. For example, the group common DCI schedules three PDSCH communications to be received by UE2 in respective PDSCH communication occasions. As shown by reference number 680, the network node may transmit preemption DCI to the group of UEs. The preemption DCI may indicate preempted communication occasions including a fourth PDSCH communication occasion scheduled for UE1, a fourth PUSCH communication scheduled for UE1, and a third PDSCH communication occasion scheduled for UE2. UE1 may refrain from receiving (e.g., refrain from monitoring for) the PDSCH communication in the fourth PDSCH communication occasion scheduled for UE1, and UE1 may refrain from transmitting the PUSCH communication in the fourth PUSCH communication occasion scheduled for UE1. UE2 may refrain from receiving the PDSCH communication in the third PDSCH communication occasion scheduled for UE2.

As indicated above, FIGS. 6A-6D are provided as an example. Other examples may differ from what is described with respect to FIGS. 6A-6D.

FIG. 7 is a diagram illustrating an example 700 associated with non-orthogonal downlink or uplink communications, in accordance with the present disclosure. As shown in FIG. 7, example 700 includes communication between a network node 110 and a UE 120. In some aspects, the network node 110 and the UE 120 may be included in a wireless network, such as wireless network 100. The network node 110 and the UE 120 may communicate via a wireless access link, which may include an uplink and a downlink. In some aspects, the network node 110 may communicate with a group of UEs that includes the UE 120.

In some aspects, the UE 120 may be an XR UE associated with an XR application. That is, the UE 120 may be, include, or be included in an XR device (e.g., XR device 410). In some aspects, the group of UEs may include a group of XR UEs associated with an XR application. In some aspects, the network node may communicate XR traffic between an XR server (e.g., XR server 405) and the UE 120 (e.g., and/or one or more other UEs included in the group of UEs). For example, the network node 110 may receive uplink XR traffic from the UE 120 and transmit the uplink XR traffic to the XR server, and the network node may receive downlink XR traffic from the XR server and transmit the downlink XR traffic to the UE 120.

As shown in FIG. 7, and by reference number 705, the network node 110 may transmit, and the UE 120 may receive, configuration information that indicates a configuration of multiple patterns of non-orthogonal slots. As used herein, a "non-orthogonal slot" refers to a slot in which a UE (e.g., the UE 120) may perform non-orthogonal communication, such as non-orthogonal multiple access (NOMA) and/or multiple user multiple input multiple output (MU-MIMO) transmission or reception. The configuration information may indicate multiple patterns of non-orthogonal slots (e.g., multiple patterns of slots for non-orthogonal communications). In some aspects, the configuration information may be included in an RRC message or a MAC control element (MAC-CE). For example, multiple layer 2 (L2) patterns of non-orthogonal slots may be configured via an RRC message, or multiple layer 3 (L3) patterns of non-orthogonal slots may be configured via a MAC-CE. Each pattern of non-orthogonal slots may indicate a pattern for which slots of a plurality of slots can be used for non-orthogonal communications by a UE (e.g., the UE 120).

As further shown in FIG. 7, and by reference number 710, in some aspects, the network node 110 may transmit, and the UE 120 may receive, DCI indicating a pattern of non-orthogonal slots to be used by the UE 120. For example, the DCI may include an indication of a pattern, among the multiple patterns of non-orthogonal slots indicated in the configuration information. That is, the DCI may indicate a pattern of slots for non-orthogonal communications by the UE 120, that is selected from the patterns of non-orthogonal slots indicated in the configuration information.

In some other aspects, the UE 120 may autonomously select the pattern of non-orthogonal slots to be used by the UE 120, without receiving DCI indicating the pattern of non-orthogonal slots. In this case, the UE 120 may select the pattern of slots to be used for non-orthogonal communications from the multiple patterns of non-orthogonal slots indicated in the configuration information. For example, the UE 120 may pseudo-randomly select which pattern to use, among the multiple patterns of non-orthogonal slots configured for the UE in the configuration information.

As further shown in FIG. 7, and by reference number 715, the UE 120 may communicate with the network node 110 using non-orthogonal communications based at least in part on the pattern of non-orthogonal slots (e.g., the pattern indicated in the DCI or autonomously selected by the UE 120). The pattern may indicate which slots, in a plurality of slots, are non-orthogonal slots (e.g., slots in which the UE 120 may use non-orthogonal communications). The UE 120 may communicate with the network node 110 using non-orthogonal communications in the non-orthogonal slots indicated in the pattern of non-orthogonal slots. For example, the UE 120 may communicate with the network node 110 using NOMA and/or MU-MIMO transmission or reception in the non-orthogonal slots. In some aspects, in the non-orthogonal slots, the UE 120 may transmit non-orthogonal transmissions (e.g., using NOMA) with grant-free resource allocations. For example, in the non-orthogonal slots, the UE 120 may transmit low-priority transmissions or a TB with low MCS in a common resource allocation in which more than one UE can utilize the same TB. As a result, the UE 120 may reduce control signaling associated with scheduling communications with the network node 110, which may result in reduced power consumption by the UE 120 and/or reduced utilization of network resources for control signaling between the network node 110 and the UE 120.

In some aspects, the UE 120 may be configured with a power offset for a non-orthogonal slot and/or the indicated/selected pattern of non-orthogonal slots, and the UE 120 may apply the power offset for the non-orthogonal transmissions (e.g., using NOMA), such that in a case of a collision between transmissions by the UE 120 and another UE in the same slot (e.g., due to two UEs using patterns that have the same non-orthogonal slots), the network node 110 may perform successive cancellation to cancel one of the colliding transmissions. For example, the power offset may be determined based at least in part on (e.g., as a function of) a priority or quality of service (QoS) of the transmission, the pattern of non-orthogonal slots used, and/or an indication from the network node 110 to use a new offset or update a current offset.

In some aspects, the operations described in connection with FIG. 7 may be performed in combination with the operations described in connection with FIGS. 6A-6D. For example, in some aspects, the configuration information included in the configuration of multiple patterns of non-orthogonal slots (described in connection with reference number 705) may be included in the configuration information described in connection with reference number 605 of FIG. 6A. In some aspects, the DCI that indicates the pattern of non-orthogonal slots (described in connection with reference number 710) may include the DCI that schedules multiple downlink communications and/or multiple uplink communications for one or more UEs, as described in connection with reference number 610 of FIG. 6A.

As indicated above, FIG. 7 is provided as an example. Other examples may differ from what is described with respect to FIG. 7.

Figure 8:
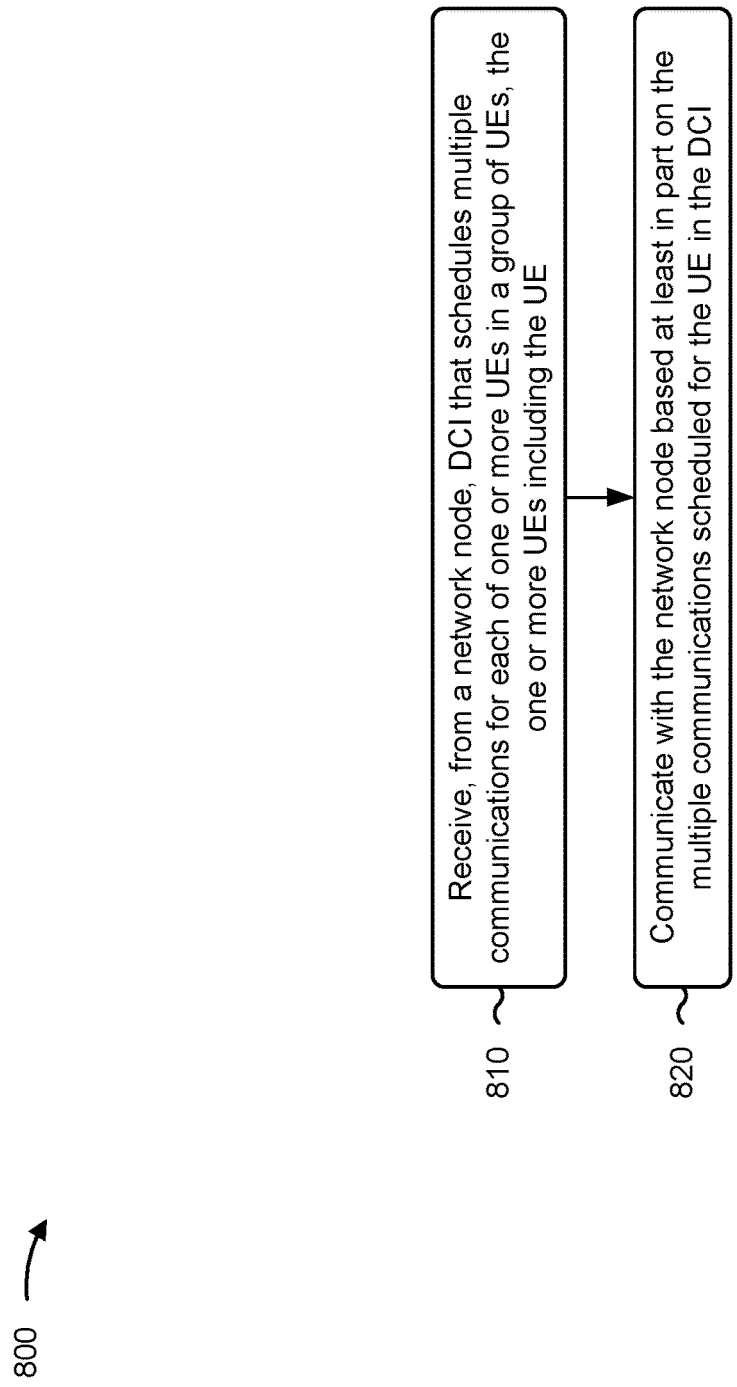
FIG. 8 is a diagram illustrating an example process performed, for example, by a UE, in accordance with the present disclosure.

FIG. 8 is a diagram illustrating an example process 800 performed, for example, by a UE, in accordance with the present disclosure. Example process 800 is an example where the UE (e.g., UE 120) performs operations associated with DCI scheduling multiple downlink or uplink communications.

As shown in FIG. 8, in some aspects, process 800 may include receiving, from a network node, DCI that schedules multiple communications for each of one or more UEs in a group of UEs, the one or more UEs including the UE (block 810). For example, the UE (e.g., using communication manager 140 and/or reception component 1002, depicted in FIG. 10) may receive, from a network node, DCI that schedules multiple communications for each of one or more UEs in a group of UEs, the one or more UEs including the UE, as described above.

As further shown in FIG. 8, in some aspects, process 800 may include communicating with the network node based at least in part on the multiple communications scheduled for the UE in the DCI (block 820). For example, the UE (e.g., using communication manager 140, reception component 1002, and/or transmission component 1004, depicted in FIG. 10) may communicate with the network node based at least in part on the multiple communications scheduled for the UE in the DCI, as described above.

Process 800 may include additional aspects, such as any single aspect or any combination of aspects described below and/or in connection with one or more other processes described elsewhere herein.

In a first aspect, the DCI schedules multiple downlink communications for the UE, and communicating with the network node includes receiving the multiple downlink communications scheduled for the UE.

In a second aspect, alone or in combination with the first aspect, the DCI schedules multiple uplink communications for the UE, and communicating with the network node includes transmitting the multiple uplink communications scheduled for the UE.

In a third aspect, alone or in combination with one or more of the first and second aspects, the DCI schedules multiple downlink communications and multiple uplink communications for the UE, and communicating with the network node includes receiving the multiple downlink communications scheduled for the UE, and transmitting the multiple uplink communications scheduled for the UE.

In a fourth aspect, alone or in combination with one or more of the first through third aspects, the DCI is a group common DCI associated with the group of UEs.

In a fifth aspect, alone or in combination with one or more of the first through fourth aspects, the group common DCI is scrambled by a group-specific RNTI for group-based scheduling of multiple downlink communications or multiple uplink communications.

In a sixth aspect, alone or in combination with one or more of the first through fifth aspects, the group common DCI includes a respective scheduling information block for each UE of the group of UEs, the respective scheduling information block for the UE indicates an allocation of resources for the multiple communications scheduled for the UE, and process 800 includes receiving configuration information indicating a location of the respective scheduling information block for the UE in the group common DCI.

In a seventh aspect, alone or in combination with one or more of the first through sixth aspects, the group common DCI includes a respective scheduling information block for each UE of the one or more UEs for which multiple communications are scheduled, the respective scheduling information block for the UE indicates an allocation of resources for the multiple communications scheduled for the UE, and process 800 includes receiving configuration information associated with determining a starting location of the respective scheduling information block for the UE in the group common DCI.

In an eighth aspect, alone or in combination with one or more of the first through seventh aspects, the one or more UEs include the UE and one or more other UEs in the group of UEs, and the group common DCI schedules multiple downlink communications for each of the one or more UEs.

In a ninth aspect, alone or in combination with one or more of the first through eighth aspects, the one or more UEs include the UE and one or more other UEs in the group of UEs, and the group common DCI schedules multiple uplink communications for each of the one or more UEs.

In a tenth aspect, alone or in combination with one or more of the first through ninth aspects, the DCI includes a first scheduling information block for the UE that indicates an allocation of resources for multiple downlink communications scheduled for the UE, and a second scheduling information block for the UE that indicates an allocation of resources for multiple uplink communications scheduled for the UE.

In an eleventh aspect, alone or in combination with one or more of the first through tenth aspects, the DCI further includes a third scheduling information block for another UE in the group of UEs that indicates an allocation of resources for multiple downlink communications scheduled for the other UE, and a fourth scheduling information block for the other UE that indicates an allocation of resources for multiple uplink communications scheduled for the other UE.

In a twelfth aspect, alone or in combination with one or more of the first through eleventh aspects, the DCI schedules the multiple communications, for each of the one or more UEs, in respective communication occasions, and process 800 includes receiving preemption DCI indicating one or more preempted communication occasions among the respective communication occasions in which the multiple communications for the UE are scheduled, and refraining from communicating with the network node in the one or more preempted communication occasions based at least in part on the preemption DCI.

In a thirteenth aspect, alone or in combination with one or more of the first through twelfth aspects, the preemption DCI is group common DCI associated with the group of UEs, and the preemption DCI further indicates one or more preempted communication occasions among the respective communication occasions in which the multiple communications for another UE, of the one or more UEs, are scheduled.

In a fourteenth aspect, alone or in combination with one or more of the first through thirteenth aspects, the DCI schedules multiple downlink communications and multiple uplink communications for the UE, and the one or more preempted communication occasions include at least one preempted downlink occasion among respective downlink occasions in which the multiple downlink communications for the UE are scheduled, and at least one preempted uplink occasion among respective uplink occasions in which the multiple uplink communications for the UE are scheduled.

In a fifteenth aspect, alone or in combination with one or more of the first through fourteenth aspects, the DCI indicates a pattern of slots for non-orthogonal communications by the UE.

In a sixteenth aspect, alone or in combination with one or more of the first through fifteenth aspects, process 800 includes receiving configuration information indicating multiple patterns of slots for non-orthogonal communications, wherein the DCI indicates a pattern among the multiple patterns of slots for non-orthogonal communications.

In a seventeenth aspect, alone or in combination with one or more of the first through sixteenth aspects, the UE is an XR UE, and the multiple communications scheduled for the UE include multiple communications of XR traffic.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
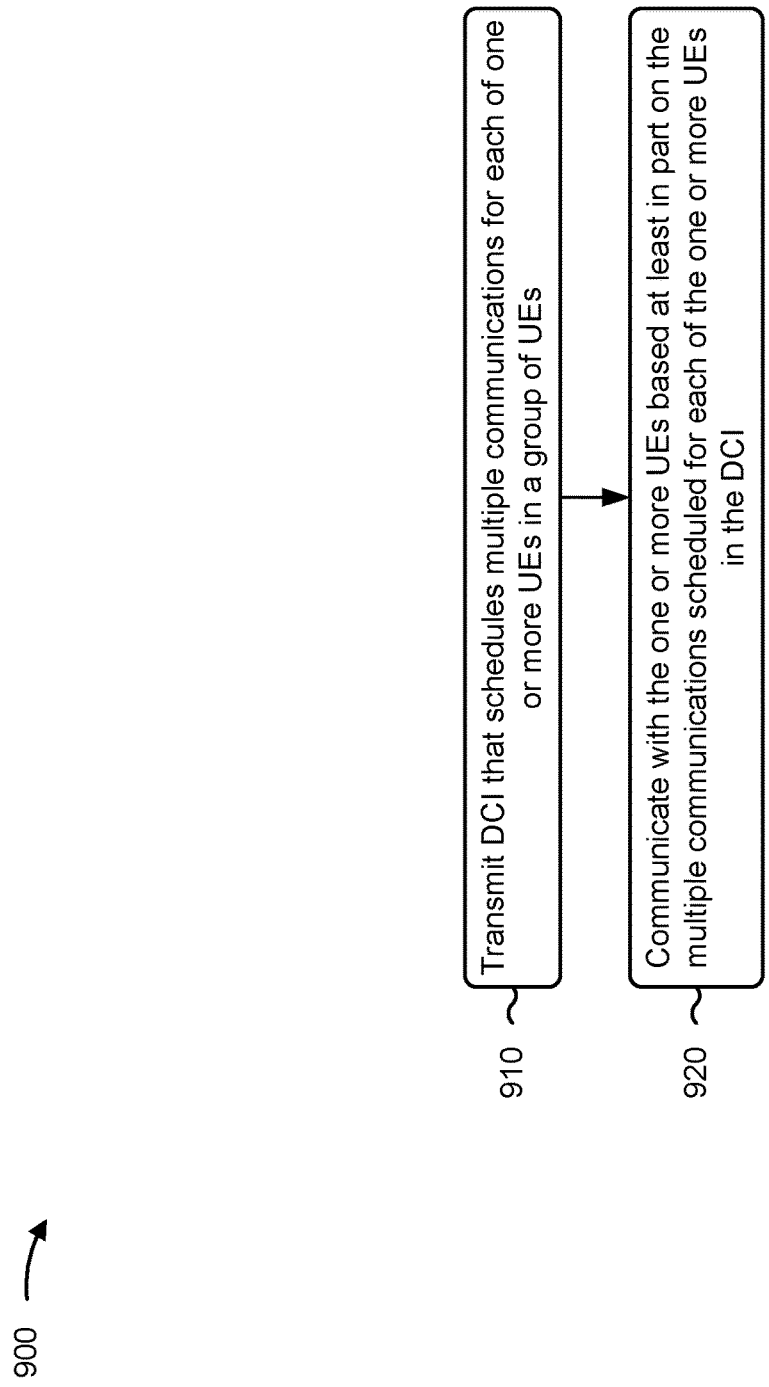
FIG. 9 is a diagram illustrating an example process performed, for example, by a network node, in accordance with the present disclosure.

FIG. 9 is a diagram illustrating an example process 900 performed, for example, by a network node, in accordance with the present disclosure. Example process 900 is an example where the network node (e.g., network node 110) performs operations associated with DCI scheduling multiple downlink or uplink communications.

As shown in FIG. 9, in some aspects, process 900 may include transmitting DCI that schedules multiple communications for each of one or more UEs in a group of UEs (block 910). For example, the network node (e.g., using communication manager 150 and/or transmission component 1104, depicted in FIG. 11) may transmit DCI that schedules multiple communications for each of one or more UEs in a group of UEs, as described above.

As further shown in FIG. 9, in some aspects, process 900 may include communicating with the one or more UEs based at least in part on the multiple communications scheduled for each of the one or more UEs in the DCI (block 920). For example, the network node (e.g., using communication manager 150, reception component 1102, and/or transmission component 1104, depicted in FIG. 11) may communicate with the one or more UEs based at least in part on the multiple communications scheduled for each of the one or more UEs in the DCI, as described above.

Process 900 may include additional aspects, such as any single aspect or any combination of aspects described below and/or in connection with one or more other processes described elsewhere herein.

In a first aspect, the DCI schedules multiple downlink communications for each of the one or more UEs, and communicating with the one or more UEs includes transmitting the multiple downlink communications scheduled for each of the one or more UEs.

In a second aspect, alone or in combination with the first aspect, the DCI schedules multiple uplink communications for each of the one or more UEs, and communicating with the one or more UEs includes receiving the multiple uplink communications scheduled for each of the one or more UEs.

In a third aspect, alone or in combination with one or more of the first and second aspects, the DCI schedules multiple downlink communications and multiple uplink communications for at least one UE of the one or more UEs, and communicating with the one or more UEs includes transmitting the multiple downlink communications scheduled for the at least one UE, and receiving the multiple uplink communications scheduled for the at least one UE.

In a fourth aspect, alone or in combination with one or more of the first through third aspects, the DCI is a group common DCI associated with the group of UEs.

In a fifth aspect, alone or in combination with one or more of the first through fourth aspects, the group common DCI is scrambled by a group-specific RNTI for group-based scheduling of multiple downlink communications or multiple uplink communications.

In a sixth aspect, alone or in combination with one or more of the first through fifth aspects, the group common DCI includes a respective scheduling information block for each UE of the group of UEs, the respective scheduling information block for each UE of the group of UEs indicates an allocation of resources for the multiple communications scheduled for that UE, and process 900 includes transmitting configuration information indicating a location, in the group common DCI, of the respective scheduling information block for each UE of the group of UEs.

In a seventh aspect, alone or in combination with one or more of the first through sixth aspects, the group common DCI includes a respective scheduling information block for each UE of the one or more UEs for which multiple communications are scheduled, and the respective scheduling information block for each UE of the one or more UEs indicates an allocation of resources for the multiple communications scheduled for that UE.

In an eighth aspect, alone or in combination with one or more of the first through seventh aspects, the group common DCI schedules multiple downlink communications for each of the one or more UEs.

In a ninth aspect, alone or in combination with one or more of the first through eighth aspects, the group common DCI schedules multiple uplink communications for each of the one or more UEs.

In a tenth aspect, alone or in combination with one or more of the first through ninth aspects, the DCI includes, for each UE of the one or more UEs a first scheduling information block that indicates an allocation of resources for multiple downlink communications scheduled for that UE, and a second scheduling information block that indicates an allocation of resources for multiple uplink communications scheduled for that UE.

In an eleventh aspect, alone or in combination with one or more of the first through tenth aspects, the DCI schedules the multiple communications, for each of the one or more UEs, in respective communication occasions, and process 900 includes transmitting preemption DCI indicating one or more preempted communication occasions among the respective communication occasions in which the multiple communications for at least one UE, of the one or more UEs, are scheduled.

In a twelfth aspect, alone or in combination with one or more of the first through eleventh aspects, the preemption DCI is group common DCI associated with the group of UEs, and the preemption DCI indicates at least one preempted communication occasion among the respective communication occasions in which the multiple communications for a first UE, of the one or more UEs, are scheduled, and at least one preempted communication occasion among the respective communication occasions in which the multiple communications for a second UE, of the one or more UEs, are scheduled.

In a thirteenth aspect, alone or in combination with one or more of the first through twelfth aspects, the DCI schedules multiple downlink communications and multiple uplink communications for the at least one UE, and the one or more preempted communication occasions include at least one preempted downlink occasion among respective downlink occasions in which the multiple downlink communications for the at least one UE are scheduled, and at least one preempted uplink occasion among respective uplink occasions in which the multiple uplink communications for the at least one UE are scheduled.

In a fourteenth aspect, alone or in combination with one or more of the first through thirteenth aspects, the DCI indicates a pattern of slots for non-orthogonal communications by at least one UE of the group of UEs.

In a fifteenth aspect, alone or in combination with one or more of the first through fourteenth aspects, process 900 includes transmitting configuration information indicating multiple patterns of slots for non-orthogonal communications, wherein the DCI indicates a pattern among the multiple patterns of slots for non-orthogonal communications.

In a sixteenth aspect, alone or in combination with one or more of the first through fifteenth aspects, the group of UEs is a group of XR UEs, and the multiple communications scheduled for each of the one or more UEs in the group of UEs include multiple communications of XR traffic.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
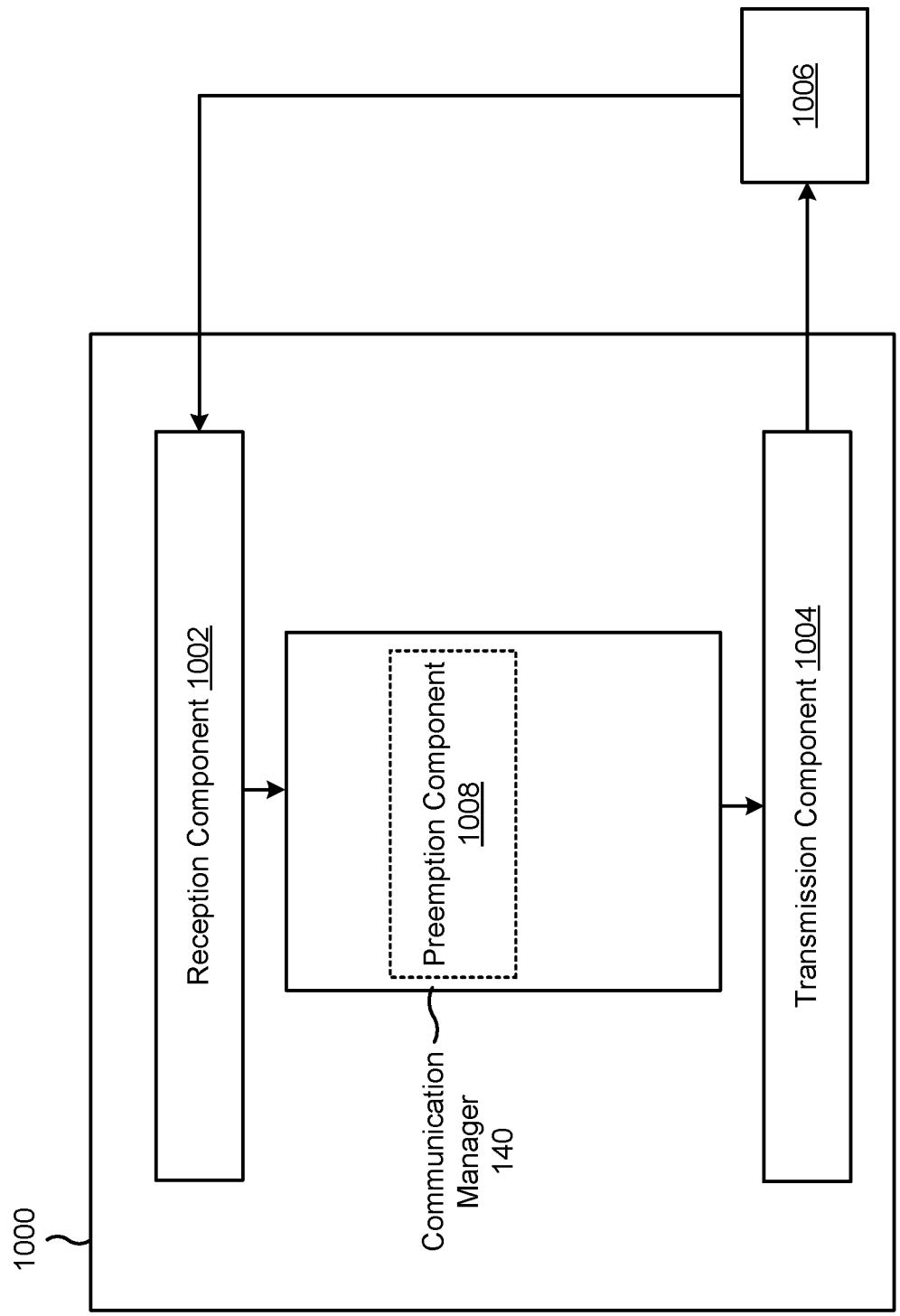
FIGS. 10-11 are diagrams of example apparatuses for wireless communication, in accordance with the present disclosure.

FIG. 10 is a diagram of an example apparatus 1000 for wireless communication, in accordance with the present disclosure. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 140. The communication manager 140 may include a preemption component 1008, among other examples.

In some aspects, the apparatus 1000 may be configured to perform one or more operations described herein in connection with FIGS. 6A-6D and 7. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The reception component 1002 may receive, from a network node, DCI that schedules multiple communications for each of one or more UEs in a group of UEs, the one or more UEs including the UE. The reception component 1002 and/or the transmission component 1004 may communicate with the network node based at least in part on the multiple communications scheduled for the UE in the DCI.

The reception component 1002 may receive configuration information indicating a location of the respective scheduling information block for the UE in the group common DCI.

The reception component 1002 may receive configuration information associated with determining a starting location of the respective scheduling information block for the UE in the group common DCI.

The reception component 1002 may receive preemption DCI indicating one or more preempted communication occasions among the respective communication occasions in which the multiple communications for the UE are scheduled.

The preemption component 1008 may refrain from communicating with the network node in the one or more preempted communication occasions based at least in part on the preemption DCI.

The reception component 1002 may receive configuration information indicating multiple patterns of slots for non-orthogonal communications, wherein the DCI indicates a pattern among the multiple patterns of slots for non-orthogonal communications.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
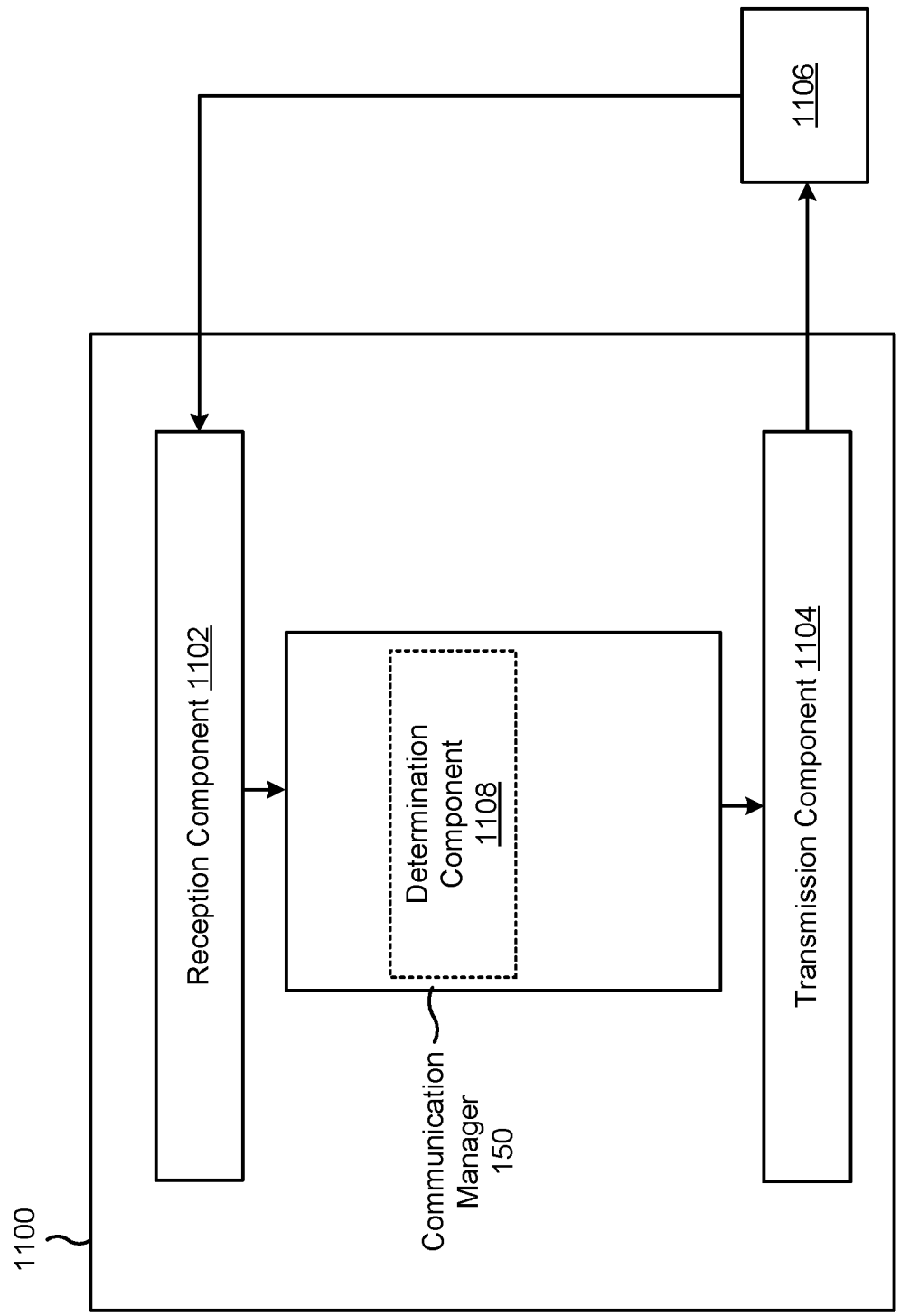

FIG. 11 is a diagram of an example apparatus 1100 for wireless communication, in accordance with the present disclosure. The apparatus 1100 may be a network node, or a network node may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 150. The communication manager 150 may include a determination component 1108, among other examples.

In some aspects, the apparatus 1100 may be configured to perform one or more operations described herein in connection with FIGS. 6A-6D and 7. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the network node described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the network node described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the network node described in connection with FIG. 2. In some aspects, the transmission component 1104 may be co-located with the reception component 1102 in a transceiver.

The transmission component 1104 may transmit DCI that schedules multiple communications for each of one or more UEs in a group of UEs. The reception component 1102 and/or the transmission component 1104 may communicate with the one or more UEs based at least in part on the multiple communications scheduled for each of the one or more UEs in the DCI.

The determination component 1108 may determine scheduling of the multiple communications for each of the one or more UEs in the group of UEs.

The transmission component 1104 may transmit configuration information indicating a location, in the group common DCI, of the respective scheduling information block for each UE of the group of UEs.

The transmission component 1104 may transmit preemption DCI indicating one or more preempted communication occasions among the respective communication occasions in which the multiple communications for at least one UE, of the one or more UEs, are scheduled.

The transmission component 1104 may transmit configuration information indicating multiple patterns of slots for non-orthogonal communications, wherein the DCI indicates a pattern among the multiple patterns of slots for non-orthogonal communications.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The Following Provides an Overview of Some Aspects of the Present Disclosure:

Aspect 1: A method of wireless communication performed by a user equipment (UE), comprising: receiving, from a network node, downlink control information (DCI) that schedules multiple communications for each of one or more UEs in a group of UEs, the one or more UEs including the UE; and communicating with the network node based at least in part on the multiple communications scheduled for the UE in the DCI.

Aspect 2: The method of Aspect 1, wherein the DCI schedules multiple downlink communications for the UE, and wherein communicating with the network node comprises: receiving the multiple downlink communications scheduled for the UE. receiving the multiple downlink communications scheduled for the UE.

Aspect 3: The method of any of Aspects 1-2, wherein the DCI schedules multiple uplink communications for the UE, and wherein communicating with the network node comprises: transmitting the multiple uplink communications scheduled for the UE.

Aspect 4: The method of any of Aspects 1-3, wherein the DCI schedules multiple downlink communications and multiple uplink communications for the UE, and wherein communicating with the network node comprises: receiving the multiple downlink communications scheduled for the UE; and transmitting the multiple uplink communications scheduled for the UE.

Aspect 5: The method of any of Aspects 1-4, wherein the DCI is a group common DCI associated with the group of UEs.

Aspect 6: The method of Aspect 5, wherein the group common DCI is scrambled by a group-specific radio network temporary identifier (RNTI) for group-based scheduling of multiple downlink communications or multiple uplink communications.

Aspect 7: The method of any of Aspects 5-6, wherein the group common DCI includes a respective scheduling information block for each UE of the group of UEs, wherein the respective scheduling information block for the UE indicates an allocation of resources for the multiple communications scheduled for the UE, and further comprising: receiving configuration information indicating a location of the respective scheduling information block for the UE in the group common DCI.

Aspect 8: The method of any of Aspects 5-6, wherein the group common DCI includes a respective scheduling information block for each UE of the one or more UEs for which multiple communications are scheduled, wherein the respective scheduling information block for the UE indicates an allocation of resources for the multiple communications scheduled for the UE, and further comprising: receiving configuration information associated with determining a starting location of the respective scheduling information block for the UE in the group common DCI.

Aspect 9: The method of any of Aspects 5-8, wherein the one or more UEs include the UE and one or more other UEs in the group of UEs, and wherein the group common DCI schedules multiple downlink communications for each of the one or more UEs.

Aspect 10: The method of any of Aspects 5-9, wherein the one or more UEs include the UE and one or more other UEs in the group of UEs, and wherein the group common DCI schedules multiple uplink communications for each of the one or more UEs.

Aspect 11: The method of any of Aspects 1-10, wherein the DCI includes: a first scheduling information block for the UE that indicates an allocation of resources for multiple downlink communications scheduled for the UE, and a second scheduling information block for the UE that indicates an allocation of resources for multiple uplink communications scheduled for the UE.

Aspect 12: The method of Aspect 11, wherein the DCI further includes: a third scheduling information block for another UE in the group of UEs that indicates an allocation of resources for multiple downlink communications scheduled for the other UE; and a fourth scheduling information block for the other UE that indicates an allocation of resources for multiple uplink communications scheduled for the other UE.

Aspect 13: The method of any of Aspects 1-12, wherein the DCI schedules the multiple communications, for each of the one or more UEs, in respective communication occasions, and further comprising: receiving preemption DCI indicating one or more preempted communication occasions among the respective communication occasions in which the multiple communications for the UE are scheduled; and refraining from communicating with the network node in the one or more preempted communication occasions based at least in part on the preemption DCI.

Aspect 14: The method of Aspect 13, wherein the preemption DCI is group common DCI associated with the group of UEs, and wherein the preemption DCI further indicates one or more preempted communication occasions among the respective communication occasions in which the multiple communications for another UE, of the one or more UEs, are scheduled.

Aspect 15: The method of any of Aspects 13-14, wherein the DCI schedules multiple downlink communications and multiple uplink communications for the UE, and wherein the one or more preempted communication occasions include: at least one preempted downlink occasion among respective downlink occasions in which the multiple downlink communications for the UE are scheduled, and at least one preempted uplink occasion among respective uplink occasions in which the multiple uplink communications for the UE are scheduled.

Aspect 16: The method of any of Aspects 1-15, wherein the DCI indicates a pattern of slots for non-orthogonal communications by the UE.

Aspect 17: The method of Aspect 16, further comprising: receiving configuration information indicating multiple patterns of slots for non-orthogonal communications, wherein the DCI indicates a pattern among the multiple patterns of slots for non-orthogonal communications.

Aspect 18: The method of any of Aspects 1-17, wherein the UE is an extended reality (XR) UE, and wherein the multiple communications scheduled for the UE include multiple communications of XR traffic.

Aspect 19: A method of wireless communication performed by a network node, comprising: transmitting downlink control information (DCI) that schedules multiple communications for each of one or more user equipments (UEs) in a group of UEs; and communicating with the one or more UEs based at least in part on the multiple communications scheduled for each of the one or more UEs in the DCI.

Aspect 20: The method of Aspect 19, wherein the DCI schedules multiple downlink communications for each of the one or more UEs, and wherein communicating with the one or more UEs comprises: transmitting the multiple downlink communications scheduled for each of the one or more UEs.

Aspect 21: The method of any of Aspects 19-20, wherein the DCI schedules multiple uplink communications for each of the one or more UEs, and wherein communicating with the one or more UEs comprises: receiving the multiple uplink communications scheduled for each of the one or more UEs.

Aspect 22: The method of any of Aspects 19-21, wherein the DCI schedules multiple downlink communications and multiple uplink communications for at least one UE of the one or more UEs, and wherein communicating with the one or more UEs comprises: transmitting the multiple downlink communications scheduled for the at least one UE; and receiving the multiple uplink communications scheduled for the at least one UE.

Aspect 23: The method of any of Aspects 19-22, wherein the DCI is a group common DCI associated with the group of UEs.

Aspect 24: The method of Aspect 23, wherein the group common DCI is scrambled by a group-specific radio network temporary identifier (RNTI) for group-based scheduling of multiple downlink communications or multiple uplink communications.

Aspect 25: The method of any of Aspects 23-24, wherein the group common DCI includes a respective scheduling information block for each UE of the group of UEs, wherein the respective scheduling information block for each UE of the group of UEs indicates an allocation of resources for the multiple communications scheduled for that UE, and further comprising: transmitting configuration information indicating a location, in the group common DCI, of the respective scheduling information block for each UE of the group of UEs.

Aspect 26: The method of any of Aspects 23-25, wherein the group common DCI includes a respective scheduling information block for each UE of the one or more UEs for which multiple communications are scheduled, and wherein the respective scheduling information block for each UE of the one or more UEs indicates an allocation of resources for the multiple communications scheduled for that UE.

Aspect 27: The method of any of Aspects 23-26, wherein the group common DCI schedules multiple downlink communications for each of the one or more UEs.

Aspect 28: The method of any of Aspects 23-27, wherein the group common DCI schedules multiple uplink communications for each of the one or more UEs.

Aspect 29: The method of any of Aspects 19-28, wherein the DCI includes, for each UE of the one or more UEs: a first scheduling information block that indicates an allocation of resources for multiple downlink communications scheduled for that UE, and a second scheduling information block that indicates an allocation of resources for multiple uplink communications scheduled for that UE.

Aspect 30: The method of any of Aspects 19-29, wherein the DCI schedules the multiple communications, for each of the one or more UEs, in respective communication occasions, and further comprising: transmitting preemption DCI indicating one or more preempted communication occasions among the respective communication occasions in which the multiple communications for at least one UE, of the one or more UEs, are scheduled.

Aspect 31: The method of Aspect 30, wherein the preemption DCI is group common DCI associated with the group of UEs, and wherein the preemption DCI indicates: at least one preempted communication occasion among the respective communication occasions in which the multiple communications for a first UE, of the one or more UEs, are scheduled, and at least one preempted communication occasion among the respective communication occasions in which the multiple communications for a second UE, of the one or more UEs, are scheduled.

Aspect 32: The method of any of Aspects 30-31, wherein the DCI schedules multiple downlink communications and multiple uplink communications for the at least one UE, and wherein the one or more preempted communication occasions include: at least one preempted downlink occasion among respective downlink occasions in which the multiple downlink communications for the at least one UE are scheduled, and at least one preempted uplink occasion among respective uplink occasions in which the multiple uplink communications for the at least one UE are scheduled.

Aspect 33: The method of any of Aspects 19-32, wherein the DCI indicates a pattern of slots for non-orthogonal communications by at least one UE of the group of UEs.

Aspect 34: The method of Aspect 33, further comprising: transmitting configuration information indicating multiple patterns of slots for non-orthogonal communications, wherein the DCI indicates a pattern among the multiple patterns of slots for non-orthogonal communications.

Aspect 35: The method of any of Aspects 19-34, wherein the group of UEs is a group of extended reality (XR) UEs, and wherein the multiple communications scheduled for each of the one or more UEs in the group of UEs include multiple communications of XR traffic.

Aspect 36: An apparatus for wireless communication at a device, comprising a processor; memory coupled with the processor; and instructions stored in the memory and executable by the processor to cause the apparatus to perform the method of one or more of Aspects 1-35.

Aspect 37: A device for wireless communication, comprising a memory and one or more processors coupled to the memory, the one or more processors configured to perform the method of one or more of Aspects 1-35.

Aspect 38: An apparatus for wireless communication, comprising at least one means for performing the method of one or more of Aspects 1-35.

Aspect 39: A non-transitory computer-readable medium storing code for wireless communication, the code comprising instructions executable by a processor to perform the method of one or more of Aspects 1-35.

Aspect 40: A non-transitory computer-readable medium storing a set of instructions for wireless communication, the set of instructions comprising one or more instructions that, when executed by one or more processors of a device, cause the device to perform the method of one or more of Aspects 1-35.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
      one or more processors, coupled to the memory, configured to:
      receive, from a network node, downlink control information (DCI) that schedules multiple communications for each of one or more UEs in a group of UEs in respective communication occasions, the one or more UEs including the UE;
      communicate with the network node based at least in part on the multiple communications scheduled for the UE in the DCI;
      receive a preemption DCI indicating one or more preempted communication occasions among the respective communication occasions in which the multiple communications for the UE are scheduled; and
      refrain from communicating with the network node in the one or more preempted communication occasions based at least in part on the preemption DCI.

2. The UE of claim 1, wherein the DCI schedules multiple downlink communications for the UE, and wherein the one or more processors, to communicate with the network node, are configured to:
receive the multiple downlink communications scheduled for the UE.

3. The UE of claim 1, wherein the DCI schedules multiple uplink communications for the UE, and wherein the one or more processors, to communicate with the network node, are configured to:
transmit the multiple uplink communications scheduled for the UE.

4. The UE of claim 1, wherein the DCI schedules multiple downlink communications and multiple uplink communications for the UE, and wherein the one or more processors, to communicate with the network node, are configured to:
receive the multiple downlink communications scheduled for the UE; and
transmit the multiple uplink communications scheduled for the UE.

5. The UE of claim 1, wherein the DCI is a group common DCI associated with the group of UEs.

6. The UE of claim 5, wherein the group common DCI is scrambled by a group-specific radio network temporary identifier (RNTI) for group-based scheduling of multiple downlink communications or multiple uplink communications.

7. The UE of claim 5, wherein the group common DCI includes a respective scheduling information block for each UE of the group of UEs, wherein the respective scheduling information block for the UE indicates an allocation of resources for the multiple communications scheduled for the UE, and wherein the one or more processors are further configured to:
receive configuration information indicating a location of the respective scheduling information block for the UE in the group common DCI.

8. The UE of claim 5, wherein the group common DCI includes a respective scheduling information block for each UE of the one or more UEs for which multiple communications are scheduled, wherein the respective scheduling information block for the UE indicates an allocation of resources for the multiple communications scheduled for the UE, and wherein the one or more processors are further configured to:
receive configuration information associated with determining a starting location of the respective scheduling information block for the UE in the group common DCI.

9. The UE of claim 5, wherein the one or more UEs include the UE and one or more other UEs in the group of UEs, and wherein the group common DCI schedules multiple downlink communications for each of the one or more UEs.

10. The UE of claim 5, wherein the one or more UEs include the UE and one or more other UEs in the group of UEs, and wherein the group common DCI schedules multiple uplink communications for each of the one or more UEs.

11. The UE of claim 1, wherein the DCI includes:
a first scheduling information block for the UE that indicates an allocation of resources for multiple downlink communications scheduled for the UE, and
a second scheduling information block for the UE that indicates an allocation of resources for multiple uplink communications scheduled for the UE.

12. The UE of claim 11, wherein the DCI further includes:
a third scheduling information block for another UE in the group of UEs that indicates an allocation of resources for multiple downlink communications scheduled for the other UE; and
a fourth scheduling information block for the other UE that indicates an allocation of resources for multiple uplink communications scheduled for the other UE.

13. The UE of claim 1, wherein the preemption DCI is group common DCI associated with the group of UEs, and wherein the preemption DCI further indicates one or more preempted communication occasions among the respective communication occasions in which the multiple communications for another UE, of the one or more UEs, are scheduled.

14. The UE of claim 1, wherein the DCI schedules multiple downlink communications and multiple uplink communications for the UE, and wherein the one or more preempted communication occasions include:
at least one preempted downlink occasion among respective downlink occasions in which the multiple downlink communications for the UE are scheduled, and
at least one preempted uplink occasion among respective uplink occasions in which the multiple uplink communications for the UE are scheduled.

15. The UE of claim 1, wherein the DCI indicates a pattern of slots for non-orthogonal communications by the UE.

16. The UE of claim 15, wherein the one or more processors are further configured to:
receive configuration information indicating multiple patterns of slots for non-orthogonal communications, wherein the DCI indicates a pattern among the multiple patterns of slots for non-orthogonal communications.

17. The UE of claim 1, wherein the UE is an extended reality (XR) UE, and wherein the multiple communications scheduled for the UE include multiple communications of XR traffic.

18. A network node for wireless communication, comprising:
a memory; and
one or more processors, coupled to the memory, configured to:
transmit downlink control information (DCI) that schedules multiple communications for each of one or more user equipments (UEs) in a group of UEs, in respective communication occasions;
communicate with the one or more UEs based at least in part on the multiple communications scheduled for each of the one or more UEs in the DCI; and
transmit a preemption DCI indicating one or more preempted communication occasions among the respective communication occasions in which the multiple communications for at least one UE of the one or more UEs, are scheduled.

19. The network node of claim 18, wherein the DCI schedules multiple downlink communications for each of the one or more UEs, and wherein the one or more processors, to communicate with the one or more UEs, are configured to:
transmit the multiple downlink communications scheduled for each of the one or more UEs.

20. The network node of claim 18, wherein the DCI schedules multiple uplink communications for each of the one or more UEs, and wherein the one or more processors, to communicate with the one or more UEs, are configured to:

receive the multiple uplink communications scheduled for each of the one or more UEs.

21. The network node of claim 18, wherein the DCI schedules multiple downlink communications and multiple uplink communications for at least one UE of the one or more UEs, and wherein the one or more processors, to communicate with the one or more UEs, are configured to:
 transmit the multiple downlink communications scheduled for the at least one UE; and
 receive the multiple uplink communications scheduled for the at least one UE.

22. The network node of claim 18, wherein the DCI is a group common DCI associated with the group of UEs.

23. The network node of claim 18, wherein the group of UEs is a group of extended reality (XR) UEs, and wherein the multiple communications scheduled for each of the one or more UEs in the group of UEs include multiple communications of XR traffic.

24. A method of wireless communication performed by a user equipment (UE), comprising:
 receiving, from a network node, downlink control information (DCI) that schedules multiple communications for each of one or more UEs in a group of UEs in respective communication occasions, the one or more UEs including the UE;
 communicating with the network node based at least in part on the multiple communications scheduled for the UE in the DCI;
 receiving a preemption DCI indicating one or more preempted communication occasions among the respective communication occasions in which the multiple communications for the UE are scheduled; and
 refraining from communicating with the network node in the one or more preempted communication occasions based at least in part on the preemption DCI.

25. The method of claim 24, wherein the DCI schedules multiple downlink communications for the UE, and wherein communicating with the network node comprises:
 receiving the multiple downlink communications scheduled for the UE.

26. The method of claim 24, wherein the DCI schedules multiple uplink communications for the UE, and wherein communicating with the network node comprises:
 transmitting the multiple uplink communications scheduled for the UE.

27. The method of claim 24, wherein the DCI schedules multiple downlink communications and multiple uplink communications for the UE, and wherein communicating with the network node comprises:
 receiving the multiple downlink communications scheduled for the UE; and
 transmitting the multiple uplink communications scheduled for the UE.

28. A method of wireless communication performed by a network node, comprising:
 transmitting downlink control information (DCI) that schedules multiple communications for each of one or more user equipments (UEs) in a group of UEs;
 communicating with the one or more UEs based at least in part on the multiple communications scheduled for each of the one or more UEs in the DCI; and
 transmitting preemption DCI indicating one or more preempted communication occasions among the respective communication occasions in which the multiple communications for at least one UE of the one or more UEs, are scheduled.

\* \* \* \* \*